US006496752B2

(12) United States Patent
Sudolcan et al.

(10) Patent No.: US 6,496,752 B2
(45) Date of Patent: Dec. 17, 2002

(54) BEVERAGE DISPENSER INCLUDING AN IMPROVED ELECTRONIC CONTROL SYSTEM

(75) Inventors: David C. Sudolcan, Atascosa, TX (US); Thomas J. Chadwell, San Antonio, TX (US)

(73) Assignee: Lancer Partnership, Ltd., San Antonio, TX (US)

( * ) Notice: Subject to any disclaimer, the term of this patent is extended or adjusted under 35 U.S.C. 154(b) by 0 days.

(21) Appl. No.: 09/767,248

(22) Filed: Jan. 22, 2001

(65) Prior Publication Data

US 2001/0032036 A1 Oct. 18, 2001

Related U.S. Application Data

(62) Division of application No. 09/575,301, filed on May 19, 2000.

(60) Provisional application No. 60/135,076, filed on May 20, 1999.

(51) Int. Cl.[7] ................................................ G06F 17/00

(52) U.S. Cl. ......................... 700/239; 700/231; 210/87; 222/61; 62/139

(58) Field of Search ................................ 700/239, 231; 222/61; 210/87; 62/139

(56) References Cited

U.S. PATENT DOCUMENTS

| | | | | | |
|---|---|---|---|---|---|
| 3,730,500 | A | * | 5/1973 | Richards | 261/140 |
| 4,465,210 | A | * | 8/1984 | Iwanami | 222/148 |
| 4,545,505 | A | * | 10/1985 | Mueller et al. | 222/65 |
| 4,629,589 | A | * | 12/1986 | Gupta et al. | 261/34 |
| 4,850,269 | A | * | 7/1989 | Hancock et al. | 99/323.1 |
| 5,000,357 | A | * | 3/1991 | Shannon et al. | 222/129.1 |
| 5,033,645 | A | * | 7/1991 | Shannon et al. | 222/61 |
| 5,178,799 | A | * | 1/1993 | Brown et al. | 261/39.1 |
| 5,592,867 | A | * | 1/1997 | Walsh et al. | 99/323.2 |
| 5,723,563 | A | * | 3/1998 | Bethuy et al. | 62/139 |
| 5,732,563 | A | * | 3/1998 | Bethuy et al. | 62/139 |
| 5,855,296 | A | * | 1/1999 | McCann et al. | 222/61 |
| 6,196,418 | B1 | * | 3/2001 | McCann et al. | 222/61 |
| 6,237,652 | B1 | * | 5/2001 | Nelson | 141/263 |
| 6,240,952 | B1 | * | 6/2001 | Schroeder | 137/240 |
| 6,312,589 | B1 | * | 11/2001 | Jarocki et al. | 210/87 |

FOREIGN PATENT DOCUMENTS

| | | | | |
|---|---|---|---|---|
| JP | 8-287324 | * | 11/1996 | G07F/5/22 |
| JP | 10-326374 | * | 12/1998 | G07F/5/22 |

* cited by examiner

*Primary Examiner*—Donald P. Walsh
*Assistant Examiner*—Michael E. Butler
(74) *Attorney, Agent, or Firm*—Christopher L. Makay

(57) ABSTRACT

A beverage dispenser includes an electronic control system for controlling beverage dispenser components. The beverage dispenser components include at least a user interface, a dispensing valve, and a valve interface for regulating the delivery of a beverage from the dispensing valve. The electronic control system includes a microcontroller for monitoring the user interface and for activating the valve interface responsive to user input, thereby regulating the delivery of a beverage from the dispensing valve. The electronic control system further includes a program memory with firmware configured in a state machine system architecture for controlling the microcontroller. The state machine system architecture supports either a non-preemptive or a preemptive multitasking real time operating system. The firmware includes supervisory control firmware, dispenser tasks firmware, and low level drivers firmware.

4 Claims, 11 Drawing Sheets

BEVERAGE DISPENSER INCLUDING AN IMPROVED ELECTRONIC CONTROL SYSTEM

This Application is a Div. of Ser. No. 09/575,301 file May 19, 2000 which claims benefit of Prov. No. 60/135,076 filed May 20, 1999.

BACKGROUND OF THE INVENTION

1. Field of the Invention

The present invention relates o beverage dispensers and, more particularly, but not by way of limitation, to an electronic control system for beverage dispensers that provides a modular, portable implementation.

2. Description of the Related Art

Beverage dispensers typically include an electronic control system that regulates the dispensing of beverages through the control of one or more dispensing valves and pumps associated therewith. The electronic control system further monitors and regulates a refrigeration unit responsible for cooling the beverage, which typically consists of a beverage syrup and a diluent, such as carbonated or plain water. The electronic control system still further monitors and regulates a carbonation system that produces the carbonated water.

Such a control system for beverage dispensers typically includes a distributed, embedded microcontroller hardware and associated firmware that directs the microcontroller hardware in controlling beverage dispenser operation. Illustratively, the microcontroller hardware monitors beverage dispenser input, which consists of dispensing valve switch activation and the like, and, responsive to such input, the microcontroller hardware produces the necessary control output, which consists of activating a dispensing valve to dispense a desired beverage. In addition, the microcontroller hardware monitors beverage dispenser conditions, which consist of frozen cooling fluid size, carbonated water level, and the like, and, responsive to condition changes, the microcontroller hardware produces the necessary control output, which consists of activating or deactivating a compressor of the refrigeration unit or activating or deactivating a pump of the carbonation system.

Current microcontroller hardware and associated firmware, once implemented, operate adequately in controlling beverage dispensers. Unfortunately, the design process that precedes beverage dispenser implementation is unacceptable because each dispenser is a unique, custom piece of equipment, requiring the microcontroller hardware and associated firmware be designed for the specific component configuration of the beverage dispenser. Thus far, there has been no emphasis on the modularity, portability, and design reuse of microcontroller hardware and associated firmware in beverage dispensers, which leads to long design and implementation periods for new beverage dispensers and the inability to alter existing beverage dispenser designs. Moreover, beverage dispenser designs change rapidly such that it is not cost efficient nor time allocation possible to design microcontroller hardware and firmware for each specific beverage dispenser application.

In today's world, it is necessary to produce and market higher quality beverage dispensers in shorter time periods. Thus, the process of designing and implementing high quality, reliable beverage dispensers must be streamlined. Consequently, there is an industry wide need for a flexible, modular, and design portable microcontroller hardware and associated firmware that supports any type of beverage dispenser components.

SUMMARY OF THE INVENTION

In accordance with the present invention, a beverage dispenser includes an electronic control system for controlling beverage dispenser components. The beverage dispenser components include at least a user interface, a dispensing valve, and a valve interface for regulating the delivery of a beverage from the dispensing valve. The user interface includes a lever activated switch, a push button switch, or a keypad switch matrix. The valve interface includes a solenoid operated valve or volumetric valve technology. The dispensing valve includes any suitable pre- or post-mix valve capable of delivering a flow of beverage therefrom.

The electronic control system includes a microcontroller for monitoring the user interface and for activating the valve interface responsive to user input, thereby regulating the delivery of a beverage from the dispensing valve. The electronic control system further includes a program memory with firmware configured in a state machine system architecture for controlling the microcontroller. The state machine system architecture supports either a non-preemptive or a preemptive multitasking real time operating system.

The electronic control system further includes an interface to permit communication with external devices, a device interface that permits the electronic control system to monitor and control a wide variety of devices attached to the beverage dispenser, and a modem to permit communication with remotely located external devices. A power supply furnishes the power levels required by the electronic control system, and a replaceable battery furnishes the power levels required by the electronic control system in the event of a power interruption. A battery controller switches between the power supply and the replaceable battery.

The electronic control system further includes a real time clock and a memory for storing time and date stamped sales, diagnostic, and service information. A refrigeration control interfaces the electronic control system with a refrigeration unit of the beverage dispenser. Similarly, a carbonation control interfaces the electronic control system with a carbonation system of the beverage dispenser.

The firmware includes supervisory control firmware, dispenser tasks firmware, and low level drivers firmware. The dispenser tasks firmware includes state machines that direct the microcontroller during the performance of tasks associated with beverage dispenser operation. The supervisory control firmware calls each state machine of the dispenser tasks firmware and, further, coordinates the activities and communications between each state machine of the dispenser tasks firmware. The low level drivers firmware interfaces the dispenser tasks firmware with the microcontroller, interfaces the dispenser tasks firmware with dedicated peripherals of the microcontroller, and interfaces the microcontroller with the beverage dispenser components.

The electronic control system is flexible, modular, and portable because electronic control system hardware and beverage dispenser components may be changed or added with minimal beverage dispenser redesign. Illustratively, changing electronic control system hardware or beverage dispenser components requires modification of the low level drivers firmware without any corresponding modification of the supervisory control firmware and the dispenser tasks firmware. Similarly, adding electronic control system hardware or beverage dispenser components requires modification of the low level drivers firmware and addition of a dispenser tasks firmware state machine and corresponding modification of the supervisory control firmware without modification of existing dispenser tasks firmware state machines.

Alternatively, changing to a different valve interface requires modification of the low level drivers firmware and substitution of a dispenser tasks firmware state machine associated with the different valve interface without any corresponding modification of the supervisory control firmware and other dispenser tasks firmware state machines. Furthermore, changing ratio control parameters associated with a beverage dispense requires modification of a beverage dispense state machine of the dispenser tasks firmware without any corresponding modification of the supervisory control firmware, the low level drivers firmware, and other dispenser tasks firmware state machines. Similarly, changing a beverage dispense ratio through physical means requires substituting components of the valve interface without any corresponding modification of the supervisory control firmware, the dispenser tasks firmware, and the low level drivers firmware.

It is therefore an object of the present invention to provide a beverage dispenser including a flexible, modular, and portable electronic control system.

It is another object of the present invention to provide an electronic control system, whereby electronic control system hardware and beverage dispenser components may be changed or added with minimal beverage dispenser redesign.

It is still another object of the present invention to provide an electronic control system including a program memory with firmware configured in a state machine system architecture that supports either a non-preemptive or a preemptive multitasking real time operating system.

It is a further object of the present invention to provide an electronic control system including an interface to permit communication with external devices.

It is still a further object of the present invention to provide an electronic control system including a device interface that permits the electronic control system to monitor and control a wide variety of devices attached to the beverage dispenser.

It is even a further object of the present invention to provide an electronic control system including and a modem to permit communication with remotely located external devices.

Still other objects, features, and advantages of the present invention will become evident to those of ordinary skill in the art in light of the following.

DETAILED DESCRIPTION OF THE PREFEREED EMBODIMENTS

Figure 1:
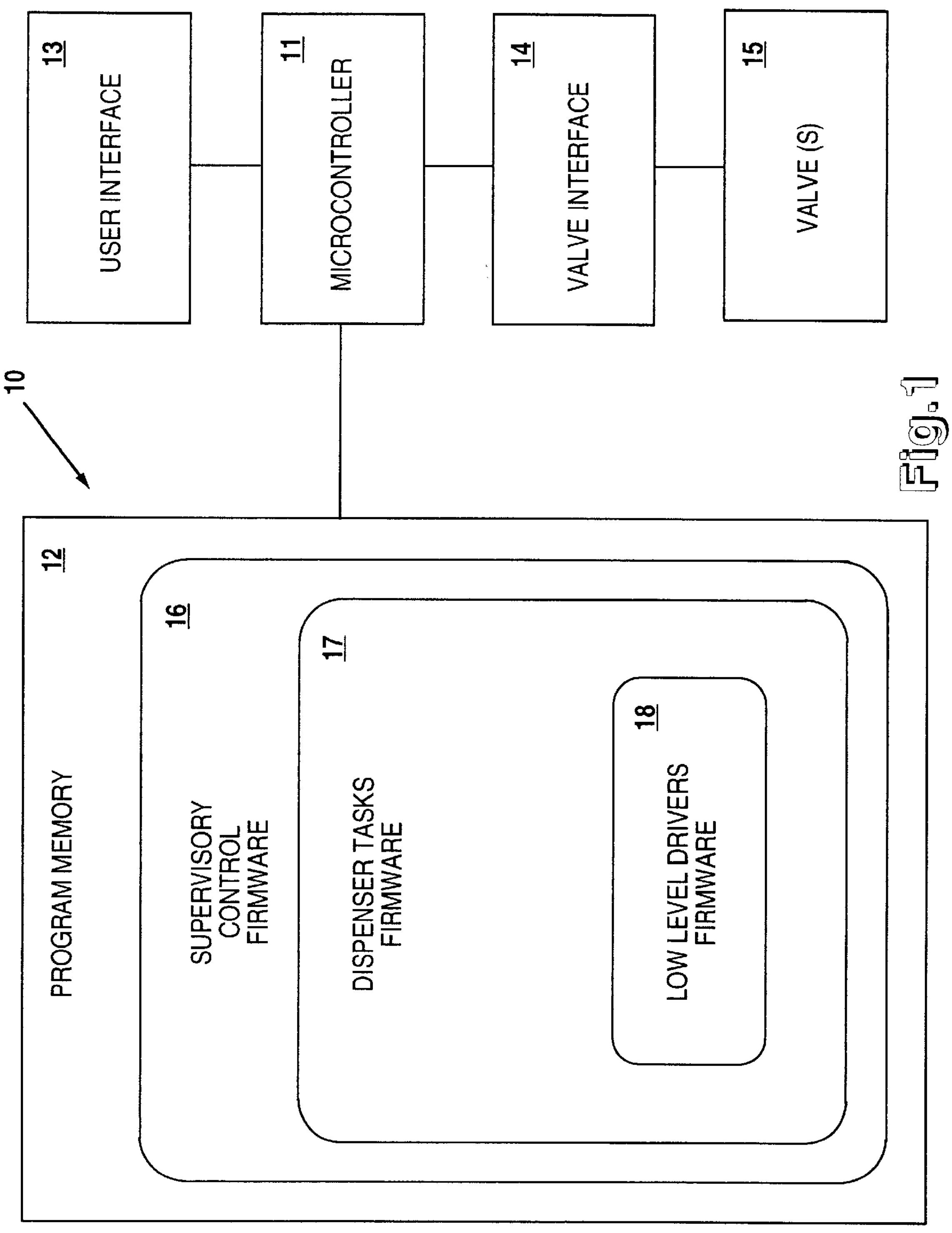
FIG. 1 is a block diagram illustrating an electronic control system for a beverage dispenser.
Figure 2:
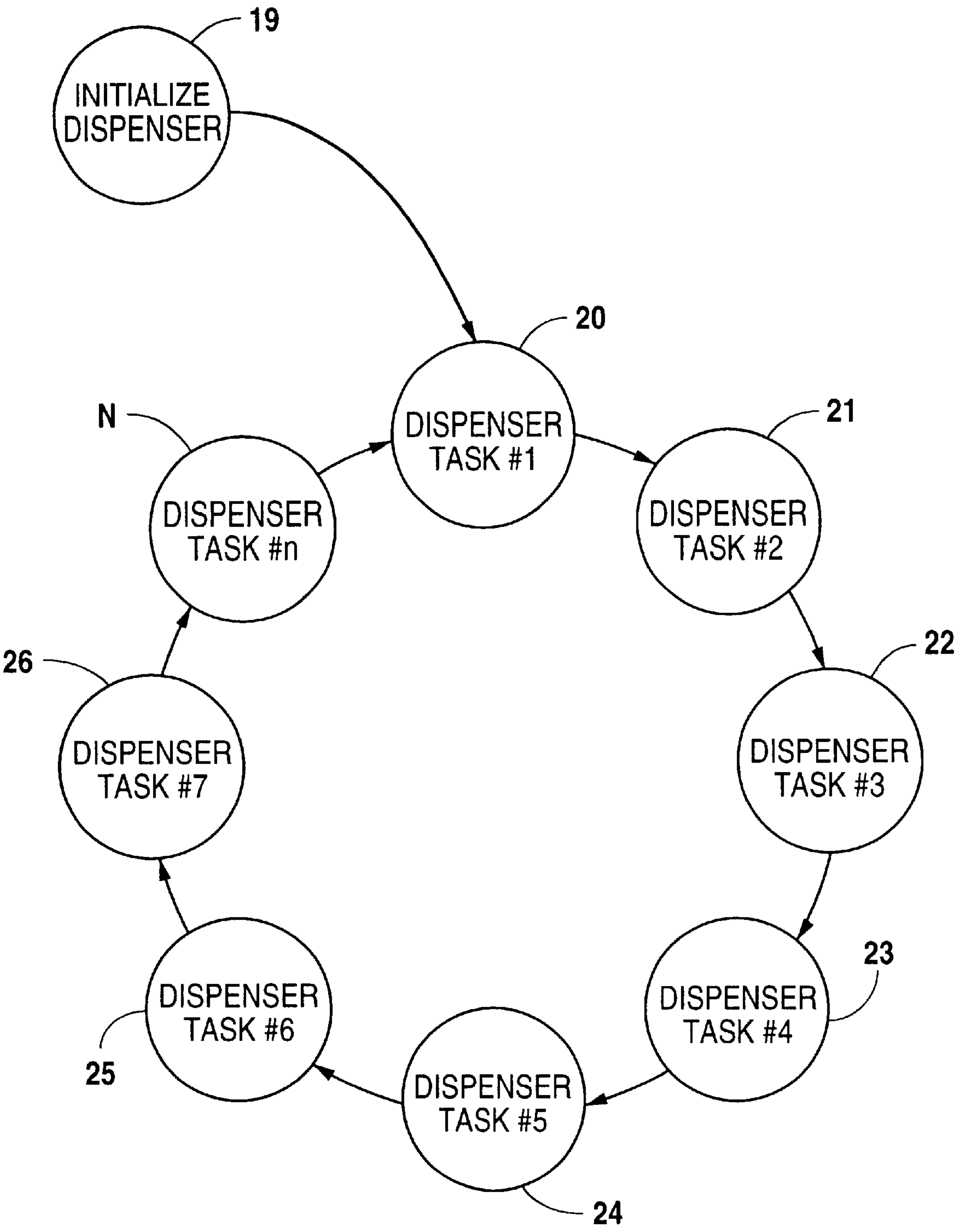
FIG. 2 is a flow chart illustrating a supervisory control loop for implementing dispenser task state machines utilized in controlling the electronic control system of FIG. 1.

As illustrated in FIGS. 1 and 2, an electronic control system 10 for a beverage dispenser includes a microcontroller 11, a program memory 12, a user interface 13, and a valve interface 14 that regulates the flow of beverage to a valve 15 or valves 15. Although not shown, those of ordinary skill in the art will recognize that the electronic control system 10 is associated with a power supply that delivers the power levels required by the components of the electronic control system 10. The microcontroller 11 is a standardly available microcontroller selected based upon the computing power necessary to implement the desired beverage dispensing tasks. The program memory 12 is a standardly available memory ordinarily associated with the selected microcontroller and chosen based upon the memory requirements of the beverage dispenser. Although the program memory 12 is illustrated as separate from the microcontroller 11, those of ordinary skill in the art will recognize that a microcontroller having sufficient memory may be utilized.

The user interface 13 includes any suitable user-interfacing device, such as a lever-activated switch, a push-button switch, or a programmable keypad having multiple push-button switches. The valve interface 14 includes any device capable of regulating the flow of a beverage to the valve 15 or the valves 15. Beverage in this embodiment includes, but is not limited to, a beverage syrup and a diluent, such as plain water or carbonated water, either pre-mixed or post-mixed at the valve 15 or the valves 15 or the diluent dispensed singularly. The valve interface 14 thus includes a solenoid that merely opens and closes to deliver a beverage or volumetric valve technology that regulates the exact amounts of diluent and beverage syrup delivered to the valve 15 or the valves 15. The valve 15 or the valves 15 are any suitable pre- or post-mix type dispensing valve capable of delivering a beverage supplied from a beverage source via the valve interface 14.

The program memory 12 includes supervisory control firmware 16, dispenser tasks firmware 17, and low level drivers firmware 18 configured in a state machine system architecture that supports either a non-preemptive or a preemptive multitasking real time operating system to provide the electronic control system 10 with flexibility, modularity, and design portability. The state machine system architecture implemented in the program memory 12 facilitates flexibility and modularity in that it allows for the rapid reconfiguration of an existing beverage dispenser incorporating the electronic control system 10. Similarly, the state machine system architecture implemented in the program memory 12 facilitates design portability by supporting a rapid development of new beverage dispensers incorporating the electronic control system 10.

The implementation of a state machine system architecture in the program memory 12 begins with the supervisory control firmware 16, which is an infinite loop that calls each state machine comprising the dispenser tasks firmware 17 and, further, coordinates the activities and communications between each of the state machines of the dispenser tasks firmware 17. Upon the application of power to the electronic control system 10, the supervisory control firmware 16 calls an initialize dispenser routine 19, which assumes control of the microcontroller 11. The initialize dispenser routine 19 includes firmware that directs the microcontroller 11 to initialize the beverage dispenser by performing such tasks as initializing microcontroller peripherals, initially deactivating control solenoids, and the like.

After the initialize dispenser routine 19 completes initialization of the beverage dispenser and, thus, relinquishes control of the microcontroller 11, the supervisory control firmware 16 calls a state machine 20, which includes firmware that assumes control of the microcontroller 11 and directs the microcontroller 11 in executing dispenser task 1. In a non-preemptive multitasking real time operating system, the state machine 20 releases control of the microcontroller 11 when there has been no change of state or upon the completion of the next step in the dispenser task 1, when there has been a change of state. Alternatively, for a preemptive multitasking real time operating system, the state machine 20 releases control of the microcontroller 11 upon the expiration of a preset time period.

The supervisory control firmware 16 then calls a state machine 21, which includes firmware that assumes control of the microcontroller 11 and directs the microcontroller 11 in executing dispenser task 2. In a non-preemptive multitasking real time operating system, the state machine 21 releases control of the microcontroller 11 when there has been no change of state or upon the completion of the next step in the dispenser task 2, when there has been a change of state. For a preemptive multitasking real time operating system, the state machine 21 releases control of the microcontroller 11 upon the expiration of a preset time period.

Once the state machine 21 releases control of the microcontroller 11, the supervisory control firmware 16 calls a state machine 22 and then each of remaining state machines 23-N, which includes firmware that assumes control of the microcontroller 11 and directs the microcontroller 11 in executing dispenser tasks 3-n. Accordingly, when a preceding state machine 20-N releases control of the microcontroller 11 under either a non-preemptive or preemptive technique, as previously described, the supervisory control firmware 16 calls the following state machine 20-N, which assumes control of the microcontroller and directs the microcontroller 11 in executing a dispenser task 1-n. The supervisory control firmware 16, therefore, systematically and sequentially calls each of the state machines 20-N, which direct the microcontroller 11 to perform the n number of dispenser tasks necessary for the operation of the beverage dispenser.

In addition to calling each of the state machines 20-N of the dispenser tasks firmware 17, the supervisory control firmware 16 coordinates the interaction among each of the state machines 20-N. Illustratively, if the state machine 25 requires data or input developed when the state machine 22 controls the microcontroller 11, the supervisory control firmware 16 oversees the transfer of such developed data or input to the state machine 25. First, the supervisory control firmware 16 regulates the storing of the data or input developed by the state machine 22 in the program memory 12. The supervisory control firmware 16 provides and then maintains the addressing information required by the state machine 22 to store the developed data or input into a selected memory location of the program memory 12. Second, when the state machine 25 assumes control of the microcontroller 11, the supervisory control firmware 16 furnishes the addressing information to the state machine 25 so that the firmware of the state machine 25 can read the developed data or input, which is used in the execution of the dispenser task 6.

The electronic control system 10 and, thus, a beverage dispenser incorporating the electronic control system 10 may support any number of beverage dispenser tasks, beginning with the beverage dispenser task of controlling the dispensing of a beverage from a valve or valves and including an n number of desired dispenser tasks. In addition to the beverage dispenser task of controlling the dispensing of a beverage from a valve or valves, beverage dispenser tasks include, but are not limited to, controlling a user interface, controlling a valve interface, regulating a refrigeration system and a carbonation system, controlling an external interface, and the like. The dispenser tasks firmware 17, thus, includes firmware in the form of state machines 20-N that, when called by the supervisory control firmware 16, assumes control of the microcontroller 11 and directs the microcontroller 11 to perform the beverage dispenser tasks necessary for the operation of the beverage dispenser. Although one of state machines 20-N at a time assumes control of the microcontroller 11 to accomplish a beverage dispenser task, those of ordinary skill in the art will recognize that the state machines 20-N are processed and run concurrently.

The low level drivers firmware 18 furnishes the microcontroller 11 with firmware that interfaces the dispenser tasks firmware 17 with the microcontroller 11 to permit the dispenser tasks firmware 17 to assume control and direct the microcontroller 11. The low level drivers firmware 18 further interfaces the dispenser tasks firmware 17 with the dedicated peripherals of the microcontroller 11 such as timers, serial ports, capture/compare ports, and the like, which support the development of data and input utilized by the microcontroller 11 in controlling the beverage dispenser. The low level drivers firmware 18 still further interfaces the microcontroller 11 with beverage dispenser components, such as solenoids, relays, and the like, which permit the microcontroller 11 to direct the operation of the beverage dispenser.

An illustration of the electronic control system 10 incorporating a state machine system architecture that directs the microcontroller 11 in controlling a beverage dispenser to dispense a beverage is described herein. After the initialize dispenser routine 19 initializes the beverage dispenser, the supervisory control firmware 16 calls the state machine 20, which, for example, could contain firmware for monitoring the user interface 13 to determine if a user has requested a beverage dispense. The user requests a beverage dispense through depressing a lever or push-button activated switch of the user interface 13 associated with a desired beverage flavor, such as cola, rootbeer, lemonade, and the like. The depression of the lever or push-button activated switch outputs from the user interface 13 to the microcontroller 11 a dispense signal that indicates a beverage dispense request.

The microcontroller 11, in a non-preemptive multitasking real time operating system, maintains the state machine 20 in a "wait for dispense signal state" as long as the user interface 13 is not outputting a dispense signal. In the "wait for dispense signal state", the state machine 20 immediately relinquishes control of the microcontroller 11 upon calling by the supervisory control firmware 16, which then calls the state machine 21. Conversely, the receipt of a dispense signal triggers the microcontroller 11 to change the state machine 20 from the "wait for dispense signal state" to a "dispense signal state". The state machine 20 then relinquishes control of the microcontroller 11, and the supervisory control firmware 16 calls the state machine 21.

When the supervisory control firmware 16 next calls the state machine 20, the microcontroller 11, in the "dispense signal state", inputs and processes the dispense signal to identify the dispense signal with the beverage flavor desired by the user. After processing the dispense signal, the microcontroller 11 changes the state machine 20 from the "dispense signal state" to a "save dispense signal state", whereupon the state machine 20 releases control of the microcontroller 11, and the supervisory control firmware 16 calls the state machine 21.

Upon the next calling of the state machine 20 by the supervisory control firmware 16, the microcontroller 11 stores the dispense signal in the program memory 12 using an address developed by the supervisory control firmware 16. The microcontroller 11 also changes the state machine 20 from the "save dispense signal state" to the "wait for dispense signal state". The state machine 20 then relinquishes control of the microcontroller 11, and the supervisory control firmware 16 calls the state machine 21.

The microcontroller 11, in a preemptive multitasking real time operating system, similarly maintains the state machine 20 in a "wait for dispense signal state" while the user interface 13 is not outputting a dispense signal, however, the state machine 20 relinquishes control of the microcontroller 11 immediately upon the expiration of a preset time period. Consequently, as long as the preset time period has not expired, the receipt of a dispense signal triggers the microcontroller 11 to change the state machine 20 from the "wait for dispense signal state" to a "dispense signal state". The microcontroller 11, in the "dispense signal state", inputs and processes the dispense signal to identify the dispense signal with the beverage flavor desired by the user.

After processing the dispense signal, the microcontroller 11 changes the state machine 20 from the "dispense signal state" to a "save dispense signal state" and, further, in the "save dispense signal state", stores the dispense signal in the program memory 12 using an address developed by the supervisory control firmware 16. The microcontroller 11 then changes the state machine 20 from the "save dispense signal state" to the "wait for dispense signal state".

Accordingly, the microcontroller 11, as long as the preset time period has not expired, either maintains the state machine 20 in the "wait for dispense signal state" or performs the tasks associated with the "dispense signal state" and the "save dispense signal state". After the expiration of the preset time period, the state machine 20 immediately relinquishes control of the microcontroller 11. Nevertheless, the state machine 20 returns to the appropriate one of the "wait for dispense signal state", the "dispense signal state", or the "save dispense signal state" upon the next calling of the state machine 20 by the supervisory control firmware 16.

The supervisory control firmware 16 sequentially calls the state machines 20-N, which perform a specific beverage dispensing task associated therewith. Illustratively, the firmware for the dispenser task 2 of the state machine 21 could be the control of a carbonation system associated with the beverage dispenser. After the state machine 21 relinquishes control of the microcontroller 11, the supervisory control firmware 16 calls the state machine 22, which, for example, could contain firmware associated with the control of a refrigeration unit of the beverage dispenser. Once the state machine 22 relinquishes control of the microcontroller 11, the supervisory control firmware 16 calls the state machine 23.

The state machine 23 could, for example, contain firmware for directing the microcontroller 11 in the dispenser task of controlling the valve interface 14 to effect a beverage dispense from the valve 15 or an appropriate one of the valves 15. The microcontroller 11, in a non-preemptive multitasking real time operating system, maintains the state machine 23 in a "dispense request state" while a user has not accessed the user interface 13 to select the dispensing of a desired beverage. The microcontroller 11 determines whether a user has accessed the user interface 13 to select the dispensing of a desired beverage by reading, using the address developed by the supervisory control firmware 16, the memory location of the program memory 12 including the stored dispense signal. In the "dispense request state", the state machine 23 immediately relinquishes control of the microcontroller 11 upon calling by the supervisory control firmware 16, which then calls the state machine 24. When a user has accessed the user interface 13 to select the dispensing of a desired beverage, the microcontroller 11 changes the state machine 23 from the "dispense request state" to a "dispense state". The state machine 23 then relinquishes control of the microcontroller 11, and the supervisory control firmware 16 calls the state machine 24.

Upon the next calling of the state machine 23, the microcontroller 11, in the "dispense state", outputs a valve signal that activates the valve interface 14 to effect a dispense of the selected beverage flavor from the valve 15 or an appropriate one of the valves 15. The microcontroller 11 then changes the state machine 23 from the "dispense state" to a "beverage delivery state", whereupon the state machine 23 releases control of the microcontroller 11, and the supervisory control firmware 16 calls the state machine 24.

The microcontroller 11 outputs a valve signal to control the valve interface 14 during a dispense in accordance with the particular component comprising the valve interface 14. Illustratively, if the valve interface 14 is a solenoid controlling a premix valve 15, the microcontroller 11 activates the solenoid, which opens to permit beverage to flow from the valve 15. Similarly, if the valve interface 14 includes multiple solenoids each controlling a premix valve 15, the microcontroller 11 activates a solenoid in accordance with the dispense signal, which opens to permit the selected beverage to flow from the appropriate one of the valves 15.

Alternatively, when the beverage dispenser is of the post-mix type, the valve interface 14 includes a solenoid for controlling the flow of a beverage flavored syrup and a solenoid for controlling the flow of a diluent, such as plain or carbonated water. Accordingly, the microcontroller 11, responsive to the dispense signal, activates both solenoids, which open to deliver the beverage flavored syrup and the diluent to the valve 15 where the beverage flavored syrup and the diluent combine to form the selected beverage. Similarly, if the valve interface 14 includes multiple solenoids each controlling the flow of a beverage flavored syrup to a valve 15 and multiple solenoids each controlling the flow of diluent to a valve 15, the microcontroller 11 activates a beverage flavored syrup and diluent solenoid pair in accordance with the dispense signal, which open to deliver the beverage flavored syrup and the diluent to the valve 15 where the beverage flavored syrup and the diluent combine to form the selected beverage.

In a further illustration, the valve interface 14 could include volumetric valve technology well known to those of ordinary skill in the art in which the microcontroller 11 monitors either the diluent flow or the beverage flavored syrup flow to provide a proper ratio between the diluent and the beverage flavored syrup in the dispensed beverage. The firmware associated with the dispensing task 4 as contained in the state machine 23, directs the microcontroller 11 to monitor the flow of either the diluent or the beverage flavored syrup utilizing a flowmeter contained in a volumetric valve for either the diluent or the beverage flavored syrup. The microcontroller 11 compares the measured flow value of either the diluent or the beverage flavored syrup to a desired amount of the diluent or the beverage flavored syrup contained in the firmware of the state machine 23. When the actual flow of either the diluent or the beverage flavored syrup equals the desired flow of either the diluent or beverage flavored syrup, the microcontroller 11 outputs a signal to a volumetric valve for either the diluent or the beverage flavored syrup, which injects either the diluent or the beverage flavored syrup into the valve 15 or an appropriate one of the valves 15 where the injected diluent or beverage flavored syrup combines with the already flowing diluent or beverage flavored syrup to form a beverage.

After the next calling of the state machine 23, the microcontroller 11, in the "beverage delivery state", determines whether to deactivate the valve interface 14, thereby stopping the dispensing of the selected beverage flavor from the valve 15 or an appropriate one of the valves 15. Illustratively, for a manual beverage dispense request, the microcontroller 11 reads from the program memory 12 the stored dispense signal to determine if the user interface 13 has continued to output a signal, thereby indicating a sustained depression of a lever or push-button activated switch. As long as there is an existing stored dispense signal, the microcontroller 11 maintains the state machine 23 in the "beverage delivery state" to continue activation of the valve interface 14, and the state machine 23 immediately relinquishes control of the microcontroller 11 to the state machine 24. Alternatively, when the stored dispense signal ceases, thereby indicating the release of the lever or push-button activated switch, the microcontroller 11 changes the state machine 23 from the "beverage delivery state" to a "beverage cease state" prior to the state machine 23 relinquishing control of the microcontroller 11 to the state machine 24.

In a further illustration, the microcontroller 11 utilizes a timer to deliver a desired amount of beverage. As long as the timer has not timed out, the microcontroller 11 maintains the state machine 23 in the "beverage delivery state" to continue activation of the valve interface 14, and the state machine 23 immediately relinquishes control of the microcontroller 11 to the state machine 24. Alternatively, when the timer times out, the microcontroller 11 changes the state machine 23 from the "beverage delivery state" to a "beverage cease state" prior to the state machine 23 relinquishing control of the microcontroller 11 to the state machine 24.

With the next calling of the state machine 23, the microcontroller 11, in the "beverage cease state", deactivates the valve interface 14, thereby stopping the dispensing of the selected beverage flavor from the valve 15 or an appropriate one of the valves 15. The microcontroller 11 also changes the state machine 23 from the "beverage cease state" to the "dispense request state". The state machine 23 then relinquishes control of the microcontroller 11 so that the supervisory control firmware 16 can call the remaining state machines 24-N, which contain other beverage dispenser tasks, as previously described.

In a preemptive multitasking real time operating system, those of ordinary skill in the art will recognize that the state machine 23 in controlling the valve interface 14 to effect a beverage dispense from the valve 15 or an appropriate one of the valves 15 will include the identical state machine steps and associated tasks as previously described, except the state machine 23 relinquishes control of the microcontroller 11 in response to the expiration of a preset time period. Furthermore, it should be understood by those of ordinary skill in the art that the dispenser tasks firmware 17 would include firmware to stop a beverage dispense in the event of a malfunction of either the user interface 13 or the valve interface 14.

The implementation of a state machine system architecture provides the electronic control system 10 with a flexible, modular, and portable design that permits the employment of the electronic control system 10 with any user interface and valve interface. Illustratively, changing from a lever activated switch to a push-button activated switch requires only modification of the low-level drivers firmware 18 to support a push-button activated switch without any modification of the supervisory control firmware 16 or the dispenser tasks firmware 17. Furthermore, changing from solenoid technology in the valve interface to volumetric valve technology requires only modification of the low-level drivers firmware 18 to support volumetric valve technology and the substitution in the dispenser tasks firmware 17 of a volumetric valve technology state machine for a solenoid technology state machine without any modification of the remaining state machines in the dispenser tasks firmware 17 or the supervisory control firmware 16.

Additionally, altering the ratio between the diluent and the beverage flavored syrup to change beverage taste is simplified due to the implementation of a state machine system architecture in the electronic control system 10. With volumetric valve technology, the volumetric valve technology state machine remains unmodified, while only ratio control parameters are modified. For example, the number of injection strokes for a diluent and/or a beverage flavored syrup piston of a diluent and/or beverage flavored syrup volumetric valve may be changed, thereby altering the ratio between the diluent and the beverage flavored syrup delivered to the valve 15 or the appropriate one of the valves 15. Furthermore, controlling beverage quality through a physical means is accomplished without changing the volumetric valve technology state machine by merely substituting components with differing characteristics, such as different volumetric valve pistons, different flow washers, different accumulators, and the like.

The implementation of a state machine system architecture provides the electronic control system 10 with a flexible, modular, and portable design that permits the employment of the electronic control system 10 with a re-configured beverage dispenser or a new beverage dispenser without any significant re-design of the electronic control system 10. The electronic control system 10 is flexible, modular, and portable with respect to a re-configured beverage dispenser and a new beverage dispenser because beverage dispenser components and/or the hardware of the electronic control system 10, such as the microcontroller 11, the type of real time operating system, the user interface 13, the valve interface 14, and the like, may be updated or added with only minimal changes in the existing supervisory control firmware 16, dispenser tasks firmware 17, and/or the low-level drivers firmware 18.

Illustratively, replacing hardware of the electronic control system 10, such as the microcontroller 11, to re-configure an existing beverage dispenser or produce a new beverage dispenser requires only replacement of the existing hardware and a corresponding change in the low-level drivers firmware 18 without any change in the supervisory control firmware 16 or the hardware dispenser tasks firmware 17 as would be required in electronic control systems for beverage dispensers not implemented using a state machine system architecture. Similarly, adding or deleting a dispenser task, such as adding or removing a dispensing valve or a carbonation system, to re-configure an existing beverage dispenser or produce a new beverage dispenser requires only the addition or removal of the beverage dispenser components associated with the dispenser task and a corresponding modification of the supervisory control firmware 16, the dispenser tasks firmware 17, and the low-level drivers firmware 18. The dispenser tasks firmware 17 is modified through the addition or deletion of a state machine including the firmware to control the added or deleted dispenser task, while the supervisory control firmware 16 is modified to call or not call the added or deleted state machine. The low-level drivers firmware 18 is modified by the addition or deletion of firmware that interfaces the added or deleted state machine with the microcontroller 11 and the microcontroller 11 with the added or removed beverage dispenser components associated with the added or deleted dispenser task.

Accordingly, the electronic control system 10 is completely modular in that any dispenser task may be added or deleted without affecting or requiring the modification of unrelated beverage dispenser tasks. Similarly, the electronic control system 10 is completely portable into new beverage dispensers for rapid re-design because the supervisory control firmware 16 and selected dispenser tasks firmware 17 and low-level drivers firmware 18 are merely incorporated into a program memory associated with a microcontroller that provides beverage dispenser control for an electronic control system incorporated into any configuration of beverage dispenser components.

Figure 3:
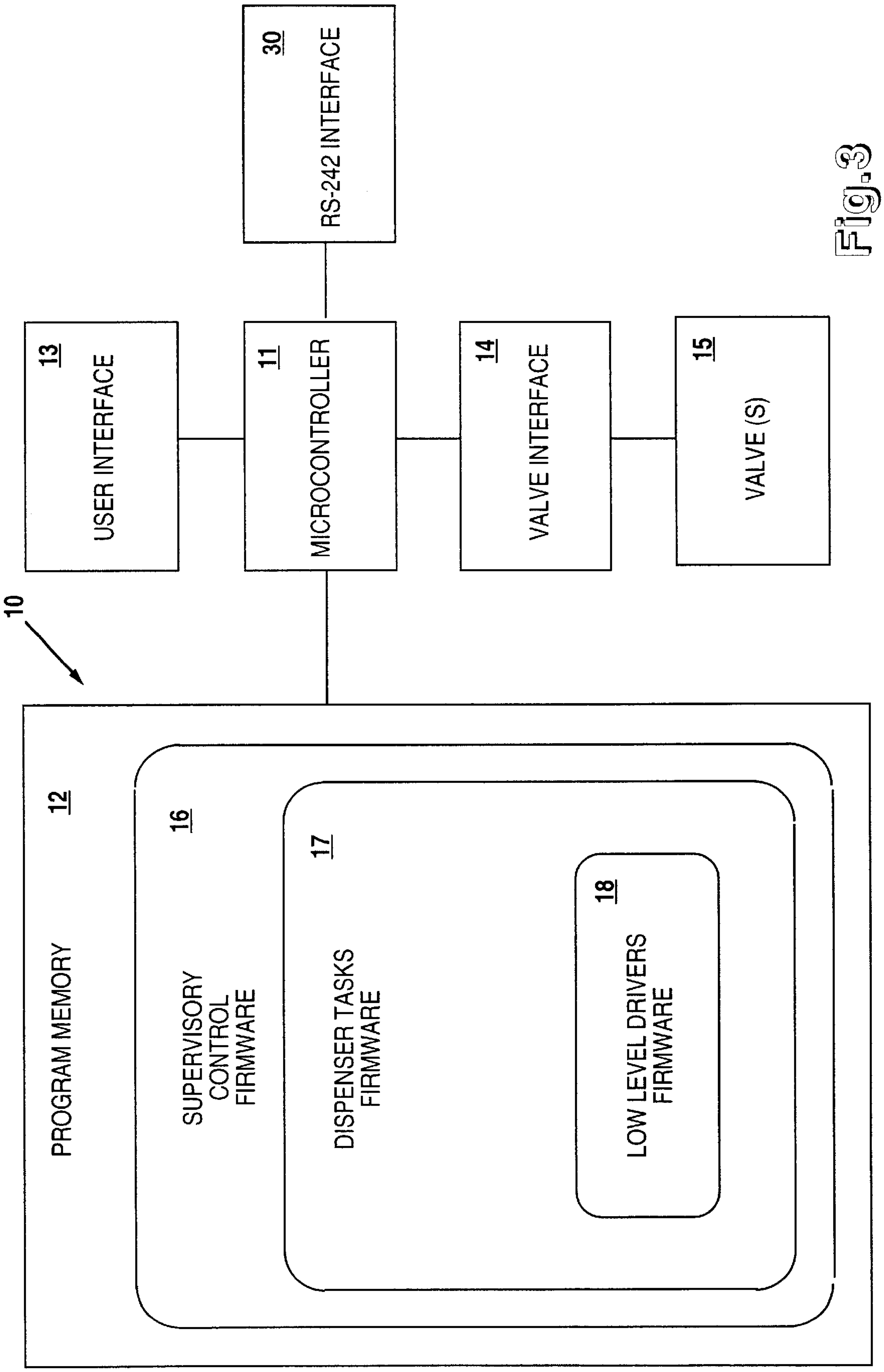
FIG. 3 is a block diagram illustrating an electronic control system for a beverage dispenser including an external interface.

As illustrated in FIG. 3, the electronic control system 10 includes the microcontroller 11, the program memory 12 including a state machine system architecture, the user interface 13, the valve interface 14 for regulating the valve 15 or the valves 15, and, further, an RS-232 interface 30. The electronic control system 10 operates identically as previously described, except, with the inclusion of the RS-232 interface 30, the dispenser tasks firmware 17 includes a state machine having firmware for directing the microcontroller 11 in its use of the RS-232 30, the supervisory control firmware 16 recognizes and calls the RS-232 interface state machine, and the low-level drivers firmware 18 includes firmware that interfaces the RS-232 interface state machine with the microcontroller 11 and the microcontroller 11 with the RS-232 interface 30.

The RS-232 interface 30 permits the electronic control system 10 to communicate with external devices such as dispenser service tools, personal computers, laptop computers, and the like. The RS-232 interface 30 specifically provides the serialized signal levels required for the microcontroller 11 to transmit information to and receive information from an external device. For example, the microcontroller 11 may contain DEX, which is a communication protocol designed to permit the interfacing of a service tool and a piece of equipment installed in the field. Although the microcontroller 11 may contain a communication protocol, it still requires an interface that permits connection of the microcontroller 11 to an external device.

The RS-232 interface 30, therefore, allows an external device to easily retrieve beverage dispensing information collected by the microcontroller 11 and stored in the program memory 12. The RS-232 interface 30, further, provides a service technician with the ability to modify the supervisory control firmware 16, the dispenser tasks firmware 17, and the low-level drivers firmware 18 without any difficult disassembly of the beverage dispenser to expose the electronic control system 10 to permit the removal of the program memory 12 for either re-installation of firmware or complete replacement. Illustratively, a service technician could connect a service tool to the RS-232 interface 30, thereby allowing the service technician to read beverage dispensing information collected by the electronic control system 10. In addition, the service technician could input new firmware directly to the program memory 12 via the microcontroller 11 so that changes to the electronic control system 10 and, thus, the beverage dispenser can be made quickly, easily, and inexpensively.

Figure 4:
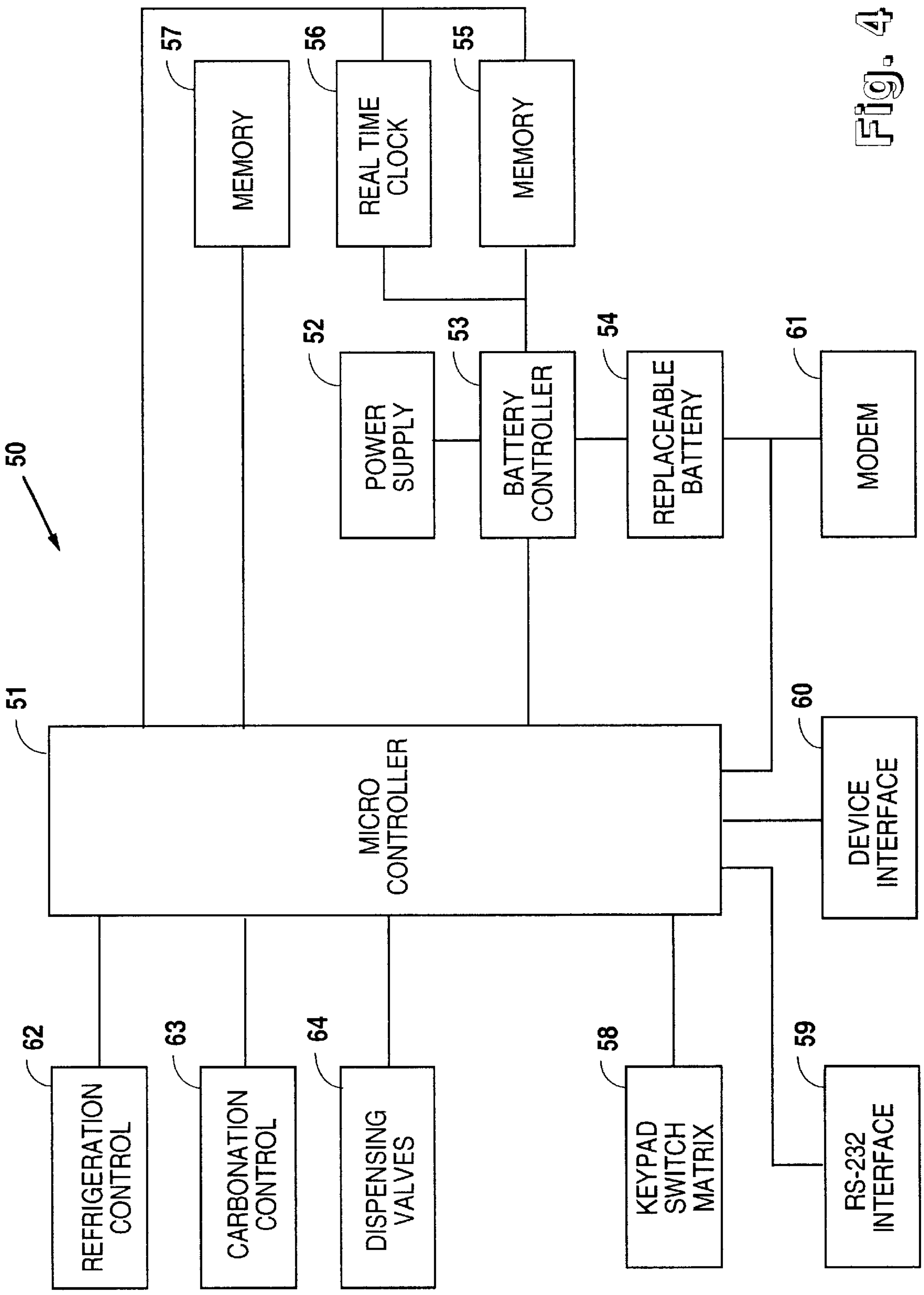
FIG. 4 is a block diagram illustrating an electronic control system for a beverage dispenser.

As illustrated in FIG. 4, an electronic control system 50 includes a microcontroller 51, a power supply 52, a battery controller 53, a replaceable battery 54, a memory 55, a real time clock 56, a memory 57, a keypad switch matrix 58, an RS-232 interface 59, a device interface 60, and a modem 61. The microcontroller 51 connects to a refrigeration control 62, a carbonation control 63, and dispensing valves 64 of a beverage dispenser to control the refrigeration system, the carbonation system, and the dispensing of a beverage, respectively. The microcontroller 51 in this embodiment is any microcontroller suitable to process the tasks required of a beverage dispenser in dispensing beverages.

The electronic control system 50 includes the power supply 52 to furnish the power levels required by the remaining components of the electronic control system 50. The electronic control system 50 includes the replaceable battery 54 to provide power to the memory 55 and the real time clock 56 in the event power delivered to the beverage dispenser by the power supply 52 is turned off or interrupted. The battery controller 53 connects to the power supply 52 and the replaceable battery 54 to allow switching between the power supply 52 and the replaceable battery 54. As long as the beverage dispenser is activated such that the power supply 52 receives power from an external source, the battery controller 53 connects the power supply 52 to provide power to the remaining components of the electronic control system 50. With the power supply 52 delivering power, the battery controller 53 prevents the replaceable battery 54 from supplying power to the memory 55 and the real time clock 56. However, when the beverage dispenser is deactivated or power from the external power source is interrupted, the battery controller 53 switches from the power supply 52, which is no longer supplying power, to the replaceable battery 54. The replaceable battery 54 supplies power to the memory 55 and the real time clock 56, which require power at all times to provide a non-volatile system memory and system clock, respectively.

The memory 55, which is a low power SRAM in this embodiment, through either power furnished from the power supply 52 or the replaceable battery 54 provides a non-volatile memory that stores, for later retrieval, time and date stamped sales, diagnostic, and service information for the beverage dispenser collected by the microcontroller 51. The memory 55 further stores the beverage dispenser set-up and configuration information utilized by the microcontroller 51 in initializing the beverage dispenser prior to beginning dispensing operations.

The real time clock 56 through either power furnished from the power supply 52 or the replaceable battery 54 provides a system clock for the microcontroller 51. The microcontroller 51 uses the time and date maintained in the real time clock 56 to time and date stamp the sales, diagnostic, and service information collected by the microcontroller 51 during the operation of the beverage dispenser.

The electronic control system 50 includes memory 57, which in this embodiment is a multiple page in system reprogrammable flash memory, to provide storage for the firmware required by the microcontroller 51 in controlling the tasks of the beverage dispenser. Although memory 57 is depicted in FIG. 4 as a separate component of the electronic control system 50, those of ordinary skill in the art will recognize that a microcontroller with sufficient memory could be substituted for the microcontroller 51 and the memory 57. The configuration of the firmware in the memory 57 is identical to the program memory 12 in that the memory 57 contains a state machine system architecture including supervisory control firmware, dispenser tasks firmware, and low-level drivers firmware that support either a preemptive or non-preemptive multitasking real time operating system. The supervisory control firmware, dispenser tasks firmware, and low-level drivers firmware direct the microcontroller 51 in performing the tasks of the beverage dispenser as described more fully herein with reference to FIG. 5.

The electronic control system 50 includes a keypad switch matrix 58 to interface with and support a keypad of the beverage dispenser that provides a user interface for the selection of a particular flavored beverage for dispensing from an appropriate one of the dispensing valves 64. In this embodiment, the keypad is a series of push-button switches arranged in a matrix format, with each push-button switch associated with a beverage flavor, such as cola, orange, lemonade, root beer, and the like. Consequently, the specific position (i.e., the row and column address) of each push-button switch must provide a dispense signal recognizable by the microcontroller 51 as associated with a specific valve of the dispensing valves 64 so that, upon the depression of a push-button switch, the microcontroller 51 will activate the appropriate one of the dispensing valves 64. The keypad switch matrix 58 thus permits the microcontroller 51 to associate each push-button switch of the keypad with a specific valve of the dispensing valves 64. Accordingly, the keypad switch matrix 58 permits the use of any variety of keypads because the particular dispensing valve associated with a push-button switch of the keypad may be assigned by the microcontroller 51 utilizing the keypad switch matrix 58.

The electronic control system 50 includes an RS-232 interface 59, a device interface 60, and a modem 61 to furnish the electronic control system 50 with the capability of external communication. The RS-232 interface 59 permits the electronic control system 50 to communicate with external devices such as dispenser service tools, personal computers, laptop computers, and the like. The RS-232 interface 59 specifically provides the serialized signal levels required for the microcontroller 51 to transmit information to and receive information from an external device. For example, the microcontroller 51 may contain DEX, which is a communication protocol designed to permit the interfacing of a service tool and a piece of equipment installed in the field. Although the microcontroller 51 may contain a communication protocol, it still requires an interface that permits connection of the microcontroller 51 to an external device.

The RS-232 interface 59, therefore, allows an external device to easily retrieve the time and date stamped sales, diagnostic, and service information for the beverage dispenser collected by the microcontroller 51 and stored in the memory 55. The RS-232 interface 59, further, provides a service technician with the ability to modify the supervisory control firmware, the dispenser tasks firmware, and the low-level drivers firmware without any difficult disassembly of the beverage dispenser to expose the electronic control system 50 to permit the removal of the memory 57 for either re-installation of firmware or complete replacement. Illustratively, a service technician could connect a service tool to the RS-232 interface 59, thereby allowing the service technician to read the time and date stamped sales, diagnostic, and service information for the beverage dispenser. In addition, the service technician could input new firmware directly to the memory 57 via the microcontroller 51 so that changes to the electronic control system 50 and, thus, the beverage dispenser can be made quickly, easily, and inexpensively.

The device interface 60 allows the microcontroller 51 to use a communication protocol that permits the electronic control system 50 to monitor and control a wide variety of devices attached thereto, such as coin acceptors, coin and bill changers, bill validators, credit card validators, network connections, and the like. The device interface 60 specifically provides the serialized signal levels required for the microcontroller 51 to transmit information to and receive information from external devices. The device interface 60, therefore, provides an option wherein the beverage dispenser through the electronic control system 50 can control any number of other devices associated with the food and beverage dispensing service industry.

The modem 61 permits the electronic control system 50 to communicate with remotely located external devices, such as dispenser service tools, personal computers, laptop computers, and the like, utilizing existing phone lines, cellular systems, or satellite based communication systems. The modem 61 specifically provides the serialized signal levels required for the microcontroller 51 to transmit information to and receive information from remotely located external devices. The modem 61, therefore, allows a remotely located external device to easily retrieve the time and date stamped sales, diagnostic, and service information for the beverage dispenser collected by the microcontroller 51 and stored in the memory 55. The modem 61, further, provides a service technician with the ability to modify the supervisory control firmware, the dispenser tasks firmware, and the low-level drivers firmware from a remote location.

The refrigeration control 62 interfaces the electronic control system 50 with the components of a refrigeration unit of the beverage dispenser. Illustratively, the refrigeration control 62 includes the solenoids and/or relays necessary for the microcontroller 51 to activate and deactivate refrigeration unit components, such as a compressor.

The carbonation control 63 interfaces the electronic control system 50 with the components of a carbonation system of the beverage dispenser. Illustratively, the carbonation control 63 includes a pulse width modulated driver, solenoids, or relays necessary for the microcontroller 51 to control carbonation system components, such as a pump.

The dispensing valves 64 in this embodiment each include a solenoid operated valve, a valve employing volumetric technology, or any suitable pre- or post-mix dispensing valve in association with a device capable of regulating the flow of a beverage to the valve. Beverage in this embodiment includes, but is not limited to, a beverage syrup and a diluent, such as plain water or carbonated water, either pre-mixed or post-mixed at an appropriate one of the dispensing valves 64 or the diluent dispensed singularly.

Figure 5:
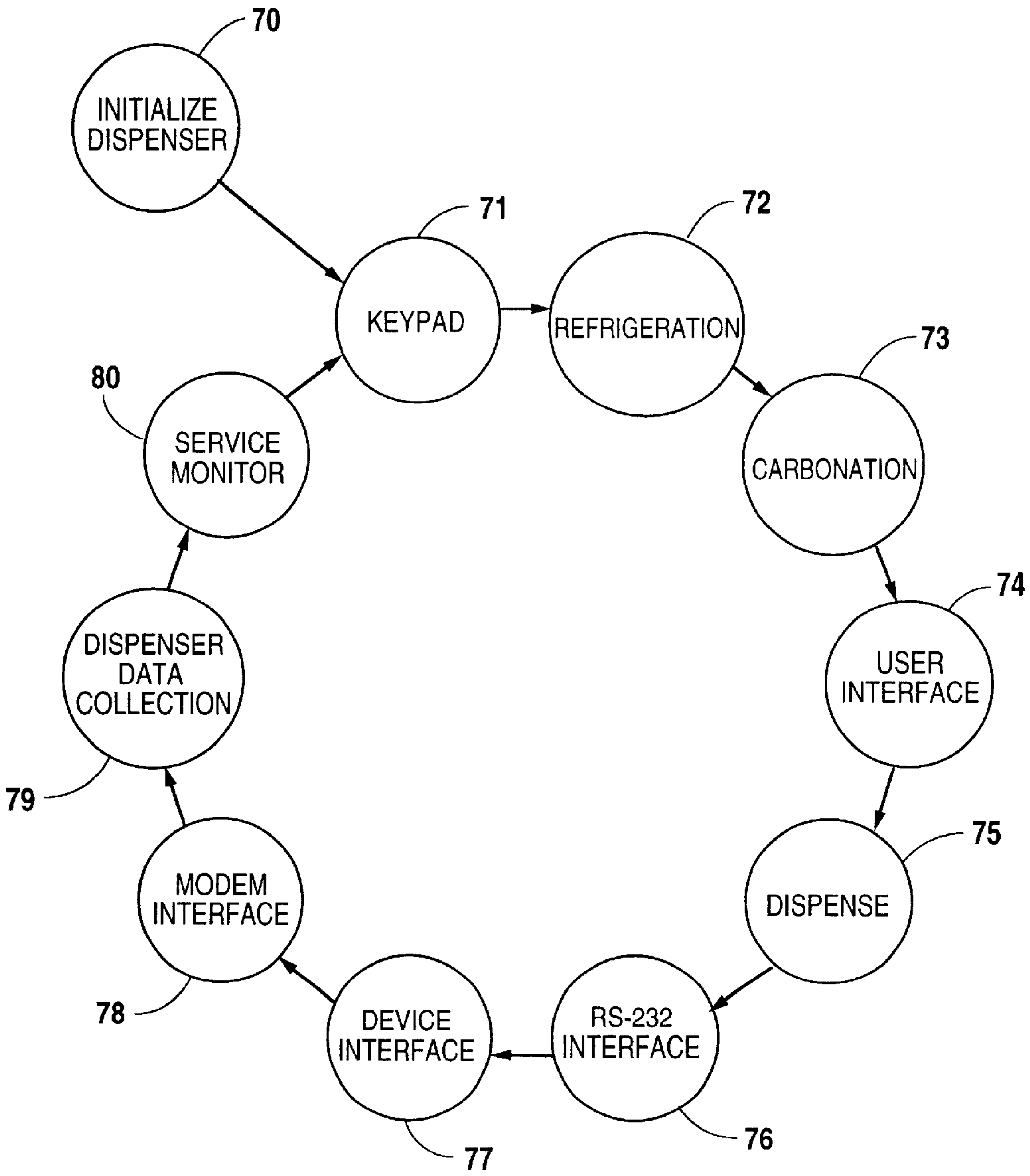
FIG. 5 is a flow chart illustrating a supervisory control loop for implementing dispenser task state machines utilized in controlling the electronic control system of FIG. 4.

As illustrated in FIG. 5, the supervisory control firmware calls an initialize dispenser routine 70 upon the application of power to the electronic control system 50. After the initialize dispenser routine 70 relinquishes control of the microcontroller 51, the supervisory control firmware sequentially calls the dispenser tasks firmware, which, in this embodiment, consists of a keypad state machine 71, a refrigeration state machine 72, a carbonation state machine 73, a user interface state machine 74, a dispense state machine 75, an RS-232 interface state machine 76, a device interface state machine 77, a modem interface state machine 78, a dispenser data collection state machine 79, and a service monitor state machine 80. In sequentially calling the dispenser tasks firmware, the supervisory control firmware operates under either a non-preemptive or a preemptive multitasking real time operating system. Consequently, for a non-preemptive system, a state machine relinquishes control of the microcontroller 51 either when no state change has occurred or upon the completion of a task or tasks associated with a particular state. Alternatively, for a preemptive system, a state machine relinquishes control of the microcontroller 51 upon the expiration of a preset time period. In this embodiment, the supervisory control firmware and the dispenser tasks firmware will be described with respect to a non-preemptive multitasking real time operating system, nevertheless, those of ordinary skill in the art will recognize that, in a preemptive multitasking real time operating system, the steps performed by each state machine will be identical, except that a state machine will relinquish control of the microcontroller 51 upon the expiration of a preset time period.

The initialize dispenser routine 70 includes firmware that directs the microcontroller 51 in initializing the beverage dispenser in preparation for operation. First, the microcontroller 51 initially deactivates all the beverage dispenser controls, such as solenoids, relays, LED's, and the like. Second, the microcontroller 51 initializes microcontroller peripherals, such as serial ports, as well as any necessary microcontroller features, such as internal timers. Third, the microcontroller 51 reads from memory 55 beverage dispenser control information, such as keypad configuration and assignment of beverage flavors to individual push-button switches of the keypad and dispensing valves and beverage flavored syrup and diluent ratios. Finally, the microcontroller 51 sets any LED's to their starting state for the beginning of beverage dispensing operations. Upon the completion of beverage dispenser initialization, the initialize dispenser routine 70 relinquishes control of the microcontroller 51, and the supervisory control firmware calls the keypad state machine 71, which assumes control of the microcontroller 51.

Figure 6:
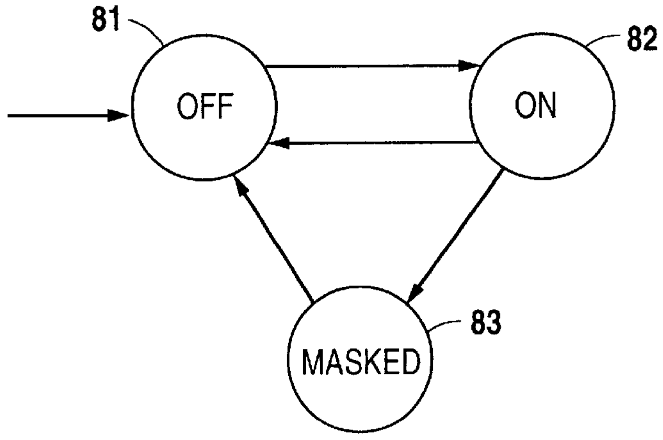
FIG. 6 is a flow chart illustrating a keypad state machine of FIG. 5.

As illustrated in FIG. 6, the keypad state machine 71 includes an "off" state 81 an "on" state 82, and a "masked" state 83. When called by the supervisory control firmware, the keypad state machine 71 sequentially examines each push-button switch of the keypad to determine if a push-button switch has been depressed or released. Illustratively, for a push-button switch of the keypad, the keypad state machine 71 initially begins in the "off" state 81, and the microcontroller 51 maintains the keypad state machine 71 in the "off" state 81 until it detects the depression of the push-button switch. While in the "off" state 81, the microcontroller 51 turns "off" the push-button switch in that it ignores input from the push-button switch. As long as the microcontroller 51 has not detected the depression of the push-button switch, the keypad state machine 71 immediately relinquishes control of the microcontroller 51 upon calling by the supervisory control firmware, which then calls the refrigeration state machine 72.

When the microcontroller 51 detects the push-button switch has remained depressed for a time period sufficient to be "on", it changes the keypad state machine 71 from the "off" state 81 to the "on" state 82 before the keypad state machine 71 relinquishes control of the microcontroller 51. Upon the next calling of the keypad state machine 71 for the depressed push button switch, the microcontroller 51, in the "on" state 82, detects either a push-button switch malfunction or the release of the push-button switch. The microcontroller 51 detects a push-button switch malfunction through a keypad timer that tracks the maximum time period the push-button switch may remain depressed. The microcontroller 51 further develops, in accordance with the depressed push-button switch, a dispense signal conveying dispense information, such as a selected beverage flavor or diluent, any selected additive flavoring, selected cup size, and the like. The microcontroller 51 also stores the dispense signal in the memory 57 using an address developed by the supervisory control firmware. As long as the keypad timer has not expired or the microcontroller 51 has not detected the release of the push-button switch, the microcontroller 51 maintains the keypad state machine 71 in the "on" state 82, and the keypad state machine 71 immediately relinquishes control of the microcontroller 51 upon calling by the supervisory control firmware.

Once the microcontroller 51 detects the push-button switch has been released for a time period sufficient to be "off", it changes the keypad state machine 71 from the "on" state 82 to the "off" state 81 before the keypad state machine 71 relinquishes control of the microcontroller 51. Upon the next calling of the keypad state machine 71 for the released push button switch, the microcontroller 51, in the "off" state 81, turns "off" the push-button switch and waits for another depression of the push-button switch as previously described. The microcontroller 51 further stores a dispense off signal in the memory 57 using an address developed by the supervisory control firmware before the keypad state machine 71 relinquishes control of the microcontroller 51. The microcontroller 51 maintains the keypad state machine 71 in the "off" state 81 until it detects the depression of the push-button switch.

If the keypad timer times out before the microcontroller 51 detects the release of the push-button switch, the microcontroller 51 changes the keypad state machine 71 from the "on" state 82 to the "masked" state 83 before the keypad state machine 71 relinquishes control of the microcontroller 51. Upon the next calling of the keypad state machine 71 for the malfunctioning push button switch, the microcontroller 51, in the "masked" state 83, turns "off" the push-button switch as previously described and waits for the release of the push-button switch. The microcontroller 51 further stores a dispense off signal in the memory 57 using an address developed by the supervisory control firmware before the keypad state machine 71 relinquishes control of the microcontroller 51. As long as the microcontroller 51 has not detected the release of the push-button switch, the microcontroller 51 maintains the keypad state machine 71 in the "masked" state 83, and the keypad state machine 71 immediately relinquishes control of the microcontroller 51 upon calling by the supervisory control firmware. When the microcontroller 51 detects the push-button switch has been released for a time period sufficient to be "off", it changes the keypad state machine 71 from the "masked" state 83 to the "off" state 81 before the keypad state machine 71 relinquishes control of the microcontroller 51. Upon the next calling of the keypad state machine 71 for the released push button switch, the microcontroller 51 operates in the "off" state 81 as previously described.

Figure 7:
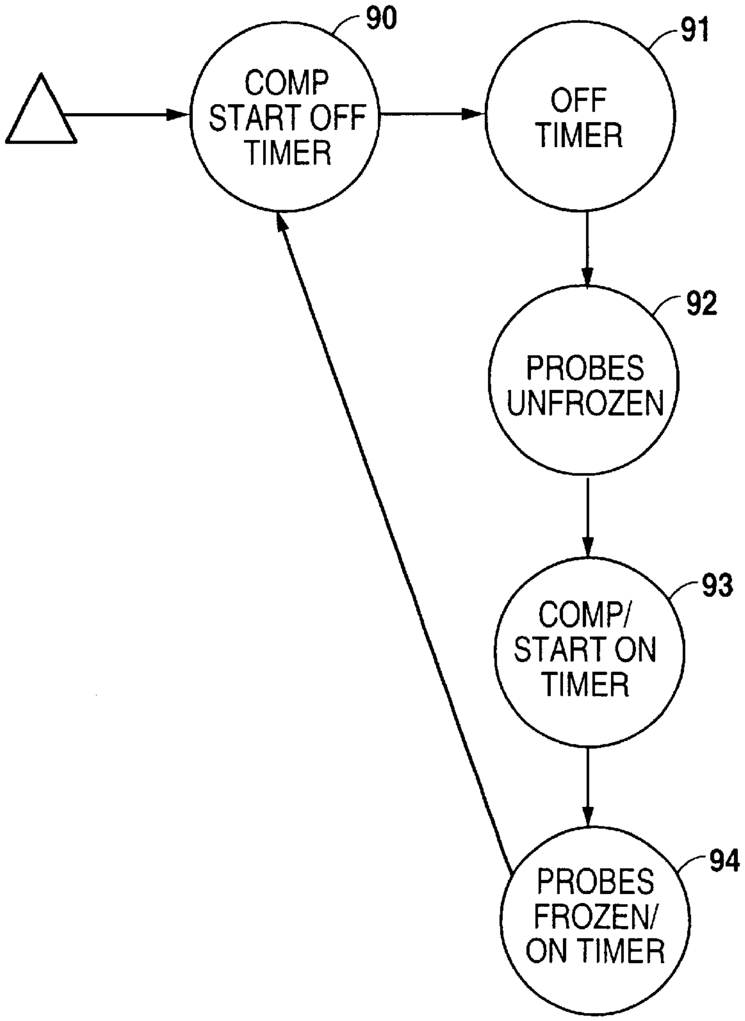
FIG. 7 is a flow chart illustrating a refrigeration state machine of FIG. 5.

As illustrated in FIG. 7, the refrigeration state machine 72 includes an "off" state 90, an "off timer" state 91, an "unfrozen probes" state 92, an "on" state 93, and a "frozen probes/on timer" state 91. The refrigeration state machine 72 initially begins in the "off" state 91, where the microcontroller 51 turns off a compressor for a refrigeration unit of the beverage dispenser and begins an off timer. The microcontroller 51 then changes the refrigeration state machine 72 from the "off" state 90 to the "off timer" state 91, whereupon the refrigeration state machine 72 relinquishes control of the microcontroller 51, and the supervisory control firmware calls the carbonation state machine 73.

With the next calling of the refrigeration state machine 72, the microcontroller 51, in the "off timer" state 91, determines whether the off timer has expired. The "off timer" state 91 provides a delay, 5 minutes in this embodiment, between a deactivation of the compressor and a subsequent reactivation to prevent compressor damage due to short cycling. As long as the off timer has not expired, the microcontroller 51 maintains the refrigeration state machine 72 in the "off timer" state 91, and the refrigeration state machine 72 immediately relinquishes control of the microcontroller 51 upon calling by the supervisory control firmware. After the off timer expires, the microcontroller 51 resets the off timer changes the refrigeration state machine 72 from the "off timer" state 91 to the "unfrozen probes" state 92, whereupon the refrigeration state machine 72 relinquishes control of the microcontroller 51, and the supervisory control firmware calls the carbonation state machine 73.

Figure 8:
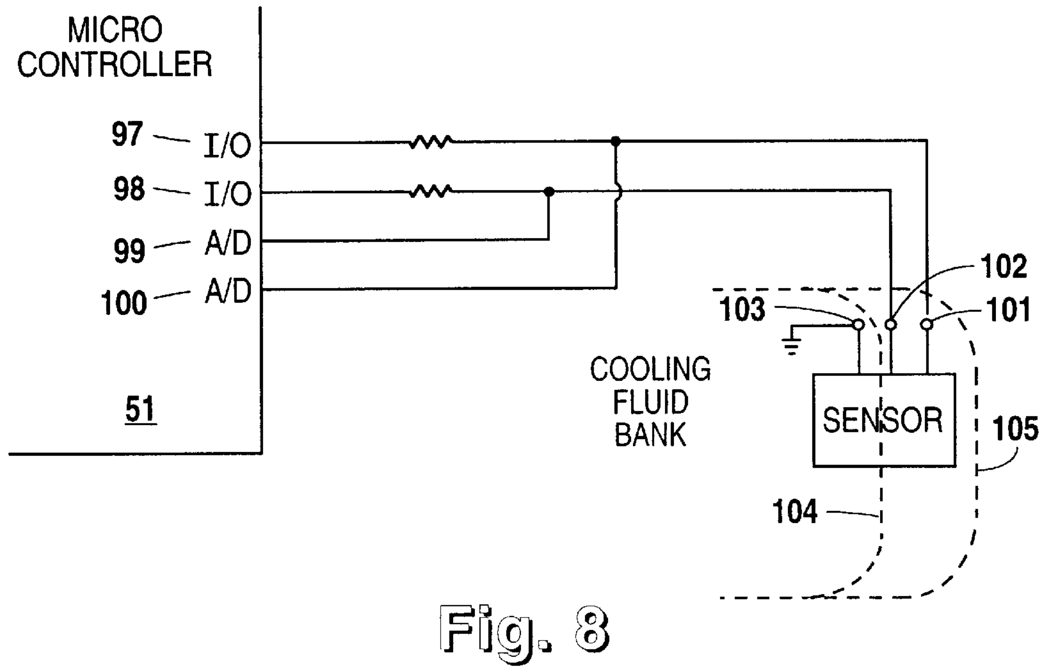
FIG. 8 is a block diagram illustrating a refrigeration unit sensing system for the electronic control system of FIG. 4.

Upon the next calling of the refrigeration state machine 72, the microcontroller 51, in the "unfrozen probes" state 92, determines whether the probes 101 and 102, as illustrated in FIG. 8, are both submerged in unfrozen cooling fluid. As long as the probe 102 remains in frozen cooling fluid, the microcontroller 51 maintains the refrigeration state machine 72 in the "unfrozen probes" state 92, and the refrigeration state machine 72 immediately relinquishes control of the microcontroller 51 upon calling by the supervisory control firmware. When the microcontroller 51 determines that both the probes 101 and 102 are submerged in unfrozen cooling fluid, it changes the refrigeration state machine 72 from the "unfrozen probes" state 92 to the "on" state 93, whereupon the refrigeration state machine 72 relinquishes control of the microcontroller 51, and the supervisory control firmware calls the carbonation state machine 73.

After the next calling of the refrigeration state machine 72, the microcontroller 51, in the "on" state 93 turns on the compressor for the refrigeration unit and begins an on timer. The microcontroller 51 then changes the refrigeration state machine 72 from the "on" state 93 to the "frozen probes/on timer" state 94, whereupon the refrigeration state machine 72 relinquishes control of the microcontroller 51, and the supervisory control firmware calls the carbonation state machine 73.

Upon the next calling of the refrigeration state machine 72, the microcontroller 51, in the "frozen probes/on timer" state 94, detects either a compressor malfunction or whether the probes 101 and 102 are both submerged in frozen cooling fluid. The microcontroller 51 detects a compressor malfunction through the on timer, which tracks the maximum time period the compressor may remain activated. As long as the probe 101 remains in unfrozen cooling fluid and the on timer has not expired, the microcontroller 51 maintains the refrigeration state machine 72 in the "frozen probes/on timer" state 94, and the refrigeration state machine 72 immediately relinquishes control of the microcontroller 51 upon calling by the supervisory control firmware.

When the microcontroller 51 determines that both the probes 101 and 102 are submerged in frozen cooling fluid and the on timer has not expired, it resets the on timer and develops a compressor functioning signal, which it stores in the memory 57 using an address developed by the supervisory control firmware. The microcontroller 51 further changes the refrigeration state machine 72 from the "frozen probes/on timer" state 94 to the "off" state 93, whereupon the refrigeration state machine 72 relinquishes control of the microcontroller 51, and the supervisory control firmware calls the carbonation state machine 73. With the next calling of the refrigeration state machine 72, the microcontroller 51 operates in the "off" state 90 as previously described.

Alternatively, if the on timer expires before both the probes 101 and 102 are submerged in frozen cooling fluid, the microcontroller 51 resets the on timer and develops a compressor malfunction signal, which it stores in the memory 57 using an address developed by the supervisory control firmware. The microcontroller 51 then changes the refrigeration state machine 72 from the "frozen probes/on timer" state 94 to the "off" state 93, whereupon the refrigeration state machine 72 relinquishes control of the microcontroller 51, and the supervisory control firmware calls the carbonation state machine 73. With the next calling of the refrigeration state machine 72, the microcontroller 51 operates in the "off" state 90 as previously described.

As illustrated in FIG. 8, the microcontroller 51 utilizes a pulse or burst signal to monitor the probes 101 and 102 in determining when they reside in either frozen or unfrozen cooling fluid. This improves over prior monitoring systems because a constant voltage monitoring signal facilitates significant plating of impurities contained in the cooling fluid on the probes, whereas a pulse or burst signal reduces or eliminates plating, thereby increasing probe life span.

The microcontroller 51 at I/O ports 97 and 98 outputs a pulse received at probes 101 and 102, respectively. When the cooling fluid is frozen to the position shown by numeral 105, the pulses are not attenuated to ground via probe 103. As a result, the A/D inputs 99 and 100 receive a signal, signifying that the probes 101 and 102 are both submerged in frozen cooling fluid. Alternatively, when the cooling fluid is frozen to the position shown by numeral 104, the pulses output at I/O ports 97 and 98 are attenuated to ground. As a result, the pulses are not applied at A/D ports 99 and 100, signifying that both probes 101 and 102 are submerged in unfrozen cooling.

Figure 9:
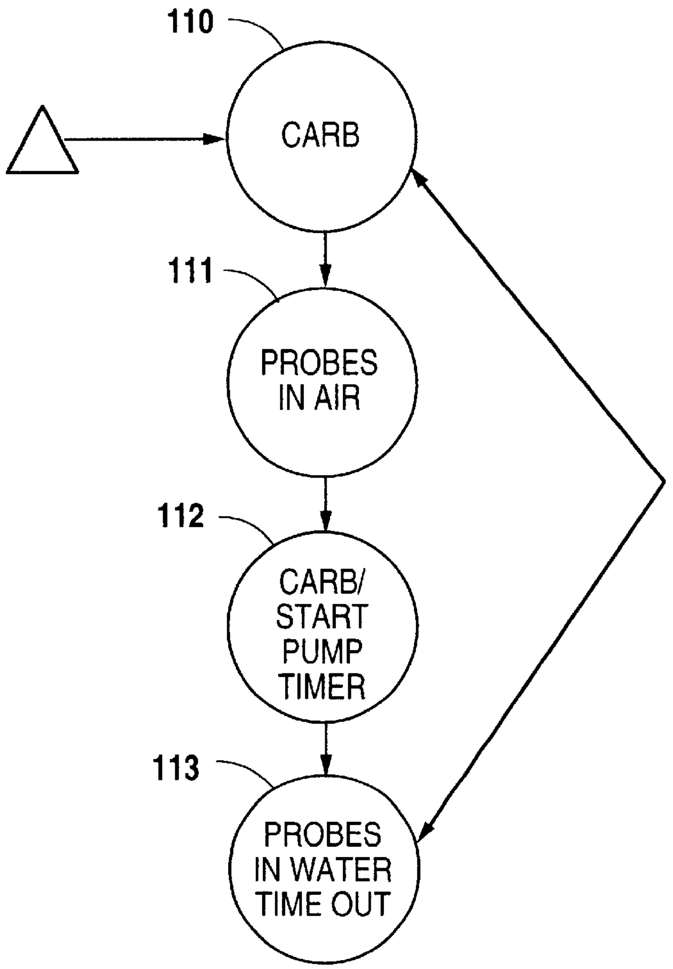
FIG. 9 is a flow chart illustrating a carbonation state machine of FIG. 5.

As illustrated in FIG. 9, the carbonation state machine 73 includes an "off" state 110, a "probes in air" state 111, an "on" state 112, and a "probes in water/on timer" state 113. The carbonation state machine 73 initially begins in the "off" state 110, where the microcontroller 51 turns off a pump for a carbonation system of the beverage dispenser. The microcontroller 51 then changes the carbonation state machine 73 from the "off" state 90 to the "probes in air" state 111, whereupon the carbonation state machine 73 relinquishes control of the microcontroller 51, and the supervisory control firmware calls the user interface state machine 74.

Figure 10:
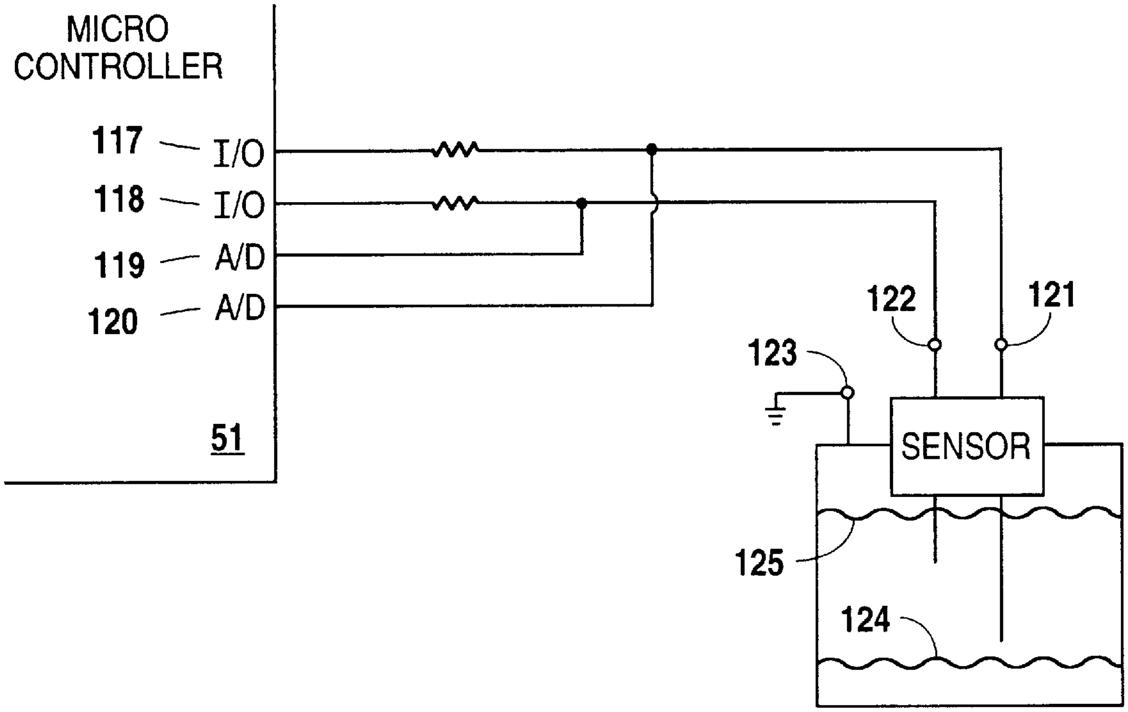
FIG. 10 is a block diagram illustrating a carbonation sensing system for the electronic control system of FIG. 4.

Upon the next calling of the carbonation state machine 73, the microcontroller 51, in the "probes in air" state 111, determines whether the probes 121 and 122, as illustrated in FIG. 10, are both exposed to air within a carbonator tank of the carbonation system. As long as the probe 121 remains submerged in water within the carbonator tank, the microcontroller 51 maintains the carbonation state machine 73 in the "probes in air" state 111, and the carbonation state machine 73 immediately relinquishes control of the microcontroller 51 upon calling by the supervisory control firmware. When the microcontroller 51 determines that both the probes 121 and 122 are exposed to air within the carbonator tank, it changes the carbonation state machine 73 from the "probes in air" state 111 to the "on" state 112, whereupon the carbonation state machine 73 relinquishes control of the microcontroller 51, and the supervisory control firmware calls the user interface state machine 74.

After the next calling of the carbonation state machine 73, the microcontroller 51, in the "on" state 112 turns on the pump for the carbonation system and begins an on timer. The microcontroller 51 then changes the carbonation state machine 73 from the "on" state 112 to the "probes in water/on timer" state 113, whereupon the carbonation state machine 73 relinquishes control of the microcontroller 51, and the supervisory control firmware calls the user interface state machine 74.

Upon the next calling of the carbonation state machine 73, the microcontroller 51, in the "probes in water/on timer" state 113, detects either a pump malfunction or whether the probes 121 and 122 are both submerged in water within the carbonator tank. The microcontroller 51 detects a pump malfunction through the on timer, which tracks the maximum time period the pump may remain activated. As long as the probe 122 remains exposed to air within the carbonator tank and the on timer has not expired, the microcontroller 51 maintains the carbonation state machine 73 in the "probes in water/on timer" state 113, and the carbonation state machine 73 immediately relinquishes control of the microcontroller 51 upon calling by the supervisory control firmware.

When the microcontroller 51 determines that both the probes 121 and 122 are submerged in water within the carbonator tank and the on timer has not expired, it resets the on timer and develops a carbonation functioning signal, which it stores in the memory 57 using an address developed by the supervisory control firmware. The microcontroller 51 further changes the carbonation state machine 73 from the "probes in water/on timer" state 113 to the "off" state 110, whereupon the carbonation state machine 73 relinquishes control of the microcontroller 51, and the supervisory control firmware calls the carbonation state machine 73. With the next calling of the carbonation state machine 73, the microcontroller 51 operates in the "off" state 110 as previously described.

Alternatively, if the on timer expires before both the probes 121 and 122 are submerged in water within the carbonator tank, the microcontroller 51 resets the on timer and develops a carbonation malfunction signal, which it stores in the memory 57 using an address developed by the supervisory control firmware. The microcontroller 51 then changes the carbonation state machine 73 from the "probes in water/on timer" state 113 to the "off" state 110, whereupon the carbonation state machine 73 relinquishes control of the microcontroller 51, and the supervisory control firmware calls the user interface state machine 74. With the next calling of the carbonation state machine 73, the microcontroller 51 operates in the "off" state 110 as previously described.

As illustrated in FIG. 10, the microcontroller 51 utilizes a pulse or burst signal to monitor the probes 121 and 122 in determining when they reside in either air or water. This improves over prior monitoring systems because a constant voltage monitoring signal facilitates significant plating of impurities contained in the water on the probes, whereas a pulse or burst signal reduces or eliminates plating, thereby increasing probe life span.

The microcontroller 51 at I/O ports 117 and 118 outputs a pulse received at probes 121 and 122, respectively. When the water level is at the position shown by numeral 125, the pulses are attenuated to ground via the tank and the probe 123. As a result, the A/D inputs 119 and 120 receive no signal, signifying that the probes 121 and 122 are both submerged in water. Alternatively, when the water level is at the position shown by numeral 124, the pulses output at I/O ports 117 and 118 are not attenuated to ground. As a result, the pulses are applied at A/D ports 119 and 120, signifying that both probes 121 and 122 are exposed to the air.

Figure 11:
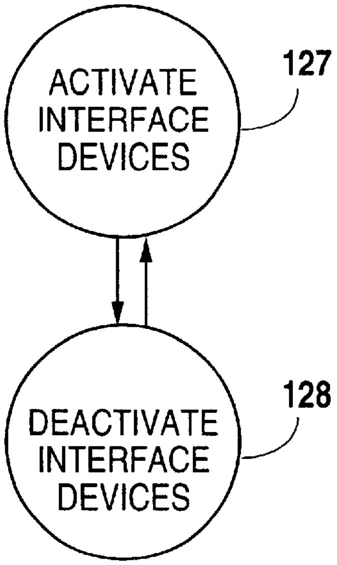
FIG. 11 is a flow chart illustrating a user interface state machine of FIG. 5.

As illustrated in FIG. 11, the supervisory control loop calls the user interface state machine 74, which assumes control of the microcontroller 51, once the carbonation state machine 73 relinquishes control of the microcontroller 51. The user interface state machine 74 begins in an "activate" state 127, and the microcontroller 51 maintains the user interface state machine 74 in the "activate" state 127 until it detects that a user interface device or devices require activation. A user interface device or devices in this embodiment include LED's; nevertheless, those of ordinary skill in the art will recognize that any device suitable to convey information to a user may be employed. The information conveyed to the user includes the selected beverage flavor or diluent, any selected additive flavoring, selected cup size, error codes, and the like. As long as the microcontroller 51 has not detected that a user interface device or devices require activation, the user interface state machine 74 immediately relinquishes control of the microcontroller 51 upon calling by the supervisory control firmware, which then calls the dispense state machine 75.

The microcontroller 51 detects that a user interface device or devices require activation by, illustratively, reading from the memory 57, using the address supplied by the supervisory control firmware, a signal or signals developed by the keypad state machine 71. When the microcontroller 51 detects a dispense signal or signals, it activates the LED's corresponding to the push-button switch or switches or dispensing valve or valves associated with the dispense signal or signals. In a further illustration, the microcontroller 51 reads from the memory 57, using the addresses supplied by the supervisory control firmware, the signals developed by the refrigeration state machine 72 and the carbonation state machine 73. When the microcontroller 51 detects the compressor malfunction signal and/or the carbonation malfunction signal, it activates the LED's that inform the user of the particular malfunction. After activating the appropriate user interface device or devices, the microcontroller 51 changes the user interface state machine 73 from the "activate" state 127 to a "deactivate" state 128, whereupon the user interface state machine 74 relinquishes control of the microcontroller 51, and the supervisory control firmware calls the dispense state machine 75.

Upon the next calling of the user interface state machine 73, the microcontroller 51, in the “deactivate” state 128, detects whether an activated user interface device or devices require deactivation. As long as the microcontroller 51 has not detected that an activated user interface device or devices require deactivation, the user interface state machine 74 immediately relinquishes control of the microcontroller 51 upon calling by the supervisory control firmware, which then calls the dispense state machine 75.

The microcontroller 51 detects that a user interface device or devices require activation by, illustratively, reading from the memory 57, using the address supplied by the supervisory control firmware, a signal or signals developed by the keypad state machine 71. When the microcontroller 51 detects a dispense off signal or signals, it deactivates the LED’s corresponding to the push-button switch or switches or dispensing valve or valves associated with the initially read dispense signal or signals. In a further illustration, the microcontroller 51 reads from the memory 57, using the addresses supplied by the supervisory control firmware, the signals developed by the refrigeration state machine 72 and the carbonation state machine 73. When the microcontroller 51 detects the compressor functioning signal and/or the carbonation functioning signal, it deactivates the LED’s that inform the user of the particular malfunction. After deactivating the appropriate user interface device or devices, the microcontroller 51 changes the user interface state machine 73 from the “deactivate” state 128 to the “activate” state 127, whereupon the user interface state machine 74 relinquishes control of the microcontroller 51, and the supervisory control firmware calls the dispense state machine 75. With the next calling of the user interface state machine 74, the microcontroller 51 operates in the “activate” state 127 as previously described.

Figure 12:
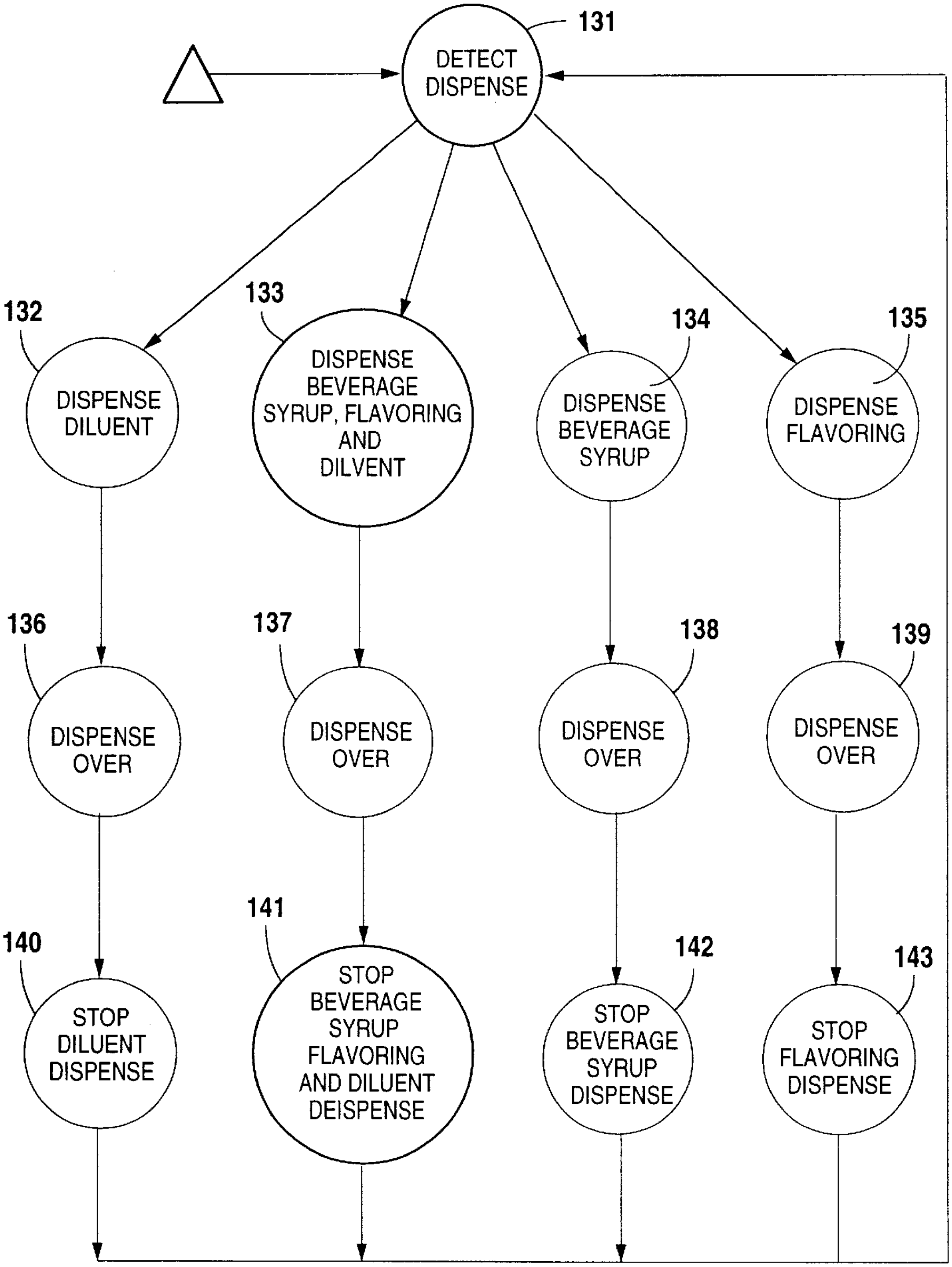
FIG. 12 is a flow chart illustrating a dispense state machine of FIG. 5.

As illustrated in FIG. 12, the dispense state machine 75, when called by the supervisory control firmware and in response to a beverage dispense request, directs the microcontroller 51 in the delivery of a beverage from a valve of the dispensing valves 64. The dispense state machine 75 initially begins in a “detect dispense” state 131, and the microcontroller 51 maintains the dispense state machine 75 in the “detect dispense” state 131 until it detects a beverage dispense request. As long as the microcontroller 51 has not detected a beverage dispense request, the dispense state machine 75 immediately relinquishes control of the microcontroller 51 upon calling by the supervisory control firmware, which then calls the RS-232 interface state machine 76.

The microcontroller 51 detects whether a beverage dispense has been requested by reading from the memory 57, using the address supplied by the supervisory control firmware, the signal or signals developed by the keypad state machine 71 as previously described. A beverage dispense request occurs when the microcontroller 51 reads from the memory 57 a dispense signal or signals developed by the keypad state machine 71. In this embodiment, a dispense signal or signals include a dispense of diluent only, which is either plain or carbonated water, or a dispense of a beverage flavored syrup in combination with diluent and, if desired, an additive flavoring, such as cherry or vanilla. A beverage dispense request via a dispense signal or signals developed by the keypad state machine 71 may also include cup size if the beverage dispenser provides preset cup size dispenses.

Alternatively, a service technician may control beverage dispensing through the attachment of a service tool that functions as the keypad state machine 71 in providing a dispense signal or signals stored in the memory 57 by the microcontroller 51 using an address developed by the supervisory control firmware. A beverage dispense request from a service technician includes a dispense of diluent only or a dispense of a beverage flavored syrup in combination with diluent and, if desired, an additive flavoring and, in addition, a dispense of beverage flavored syrup only or additive flavoring only. The electronic control system 50, thus, makes it extremely easy to test and diagnose beverage dispenser problems because it is unimportant to the electronic control system 50 whether the beverage dispense request is initiated by a user or a service technician through a service tool.

After the detection of a beverage dispense request, the microcontroller 51 changes the dispense state machine 75 from the “detect dispense” state 131 to one of the “dispense delivery” states 132–135, depending upon the type of beverage dispense request. The dispense state machine 75 then relinquishes control of the microcontroller 51, and the supervisory control firmware calls the RS-232 interface state machine 76.

When the beverage dispense request was for diluent only, the microcontroller 51 returns to the “dispense delivery” state 132 upon the next calling of the dispense state machine 75. The microcontroller 51, in the “dispense delivery” state 132, activates an appropriate one of the dispensing valves 64, which dispenses diluent only. After activating an appropriate one of the dispensing valves 64, the microcontroller 51 changes the dispense state machine 75 from the “dispense delivery” state 132 to the “dispense over” state 136. The dispense state machine 75 then relinquishes control of the microcontroller 51, and the supervisory control firmware calls the RS-232 interface state machine 76.

With the next calling of the dispense state machine 75, the microcontroller 51, in the “dispense over” state 136, determines when the activated valve of the dispensing valves 64 should be deactivated, thereby terminating the beverage dispense. As long as the microcontroller 51 determines the activated valve of the dispensing valves 64 does not require deactivation, it maintains the dispense state machine 75 in the “dispense over” state 136, whereupon the dispense state machine 75 immediately relinquishes control of the microcontroller 51 upon calling by the supervisory control firmware, which then calls the RS-232 interface state machine 76.

In this embodiment, the microcontroller 51 decides when to deactivate an activated valve of the dispensing valves 64 in response to either manual control of the beverage dispenser keypad or a preset beverage dispense volume or time period. During manual control, the microcontroller 51 determines a beverage dispense is completed when the keypad state machine 71 furnishes a dispense off signal or signals associated with the activated valve of the dispensing valves 64. When the microcontroller 51 detects the dispense off signal or signals, it changes the dispense state machine 75 from the “dispense over” state 136 to the “stop dispense” state 140. The dispense state machine 75 then relinquishes control of the microcontroller 51, and the supervisory control firmware calls the RS-232 interface state machine 76.

For a preset beverage dispense volume or time period, the dispense state machine 75 includes a preset beverage dispense command for each type of beverage dispense request. The preset beverage dispense commands each direct the microcontroller 51 to activate an appropriate one of the dispensing valves 64 and to maintain that valve activated for the beverage dispense volume or time period necessary to produce the requested beverage. Illustratively, for a diluent only beverage dispense into a large cup, the microcontroller 51, under the direction of the appropriate preset beverage dispense command, activates the correct valve of the dispensing valves 64, which delivers a volume of diluent or diluent for a time period that fills the large cup. Upon the delivery of the correct volume of diluent or the expiration of the preset beverage dispense time period, the microcontroller 51 changes the dispense state machine 75 from the "dispense over" state 136 to the "stop dispense" state 140. The dispense state machine 75 then relinquishes control of the microcontroller 51, and the supervisory control firmware calls the RS-232 interface state machine 76.

Upon the next calling of the dispense state machine 75, the microcontroller 51, in the "stop dispense" state 140, deactivates the activated valve of the dispensing valves 64. After the deactivation of the activated valve of the dispensing valves 64, the microcontroller 51 changes the dispense state machine 75 from the "stop dispense" state 140 to the "detect dispense" state 131. The dispense state machine 75 then relinquishes control of the microcontroller 51, and the supervisory control firmware calls the RS-232 interface state machine 76. With the next calling of the dispense state machine 75, the microcontroller 51 operates in the "detect dispense" state 131 as previously described.

When the beverage dispense request was for a complete beverage, the microcontroller 51 returns to the "dispense delivery" state 133 upon the next calling of the dispense state machine 75. The microcontroller 51, in the "dispense delivery" state 133, activates an appropriate one of the dispensing valves 64, which dispenses a beverage flavored syrup, a diluent and, if desired, an additive flavoring. After activating an appropriate one of the dispensing valves 64, the microcontroller 51 changes the dispense state machine 75 from the "dispense delivery" state 133 to the "dispense over" state 137. The dispense state machine 75 then relinquishes control of the microcontroller 51, and the supervisory control firmware calls the RS-232 interface state machine 76.

With the next calling of the dispense state machine 75, the microcontroller 51, in the "dispense over" state 137, determines when the activated valve of the dispensing valves 64 should be deactivated, thereby terminating the beverage dispense. As long as the microcontroller 51 determines the activated valve of the dispensing valves 64 does not require deactivation, it maintains the dispense state machine 75 in the "dispense over" state 137, whereupon the dispense state machine.75 immediately relinquishes control of the microcontroller 51 upon calling by the supervisory control firmware, which then calls the RS-232 interface state machine 76.

During manual control, once the microcontroller 51 determines the keypad state machine 71 has furnished a dispense off signal or signals associated with the activated valve of the dispensing valves 64, it changes the dispense state machine 75 from the "dispense over" state 137 to the "stop dispense" state 141. The dispense state machine 75 then relinquishes control of the microcontroller 51, and the supervisory control firmware calls the RS-232 interface state machine 76.

For a complete beverage dispense into an extra-large cup, the microcontroller 51, under the direction of an appropriate preset beverage dispense command, activates the correct valve of the dispensing valves 64, which delivers a beverage flavored syrup, a diluent and, if desired, an additive flavoring in a volume or for a time period that fills the extra-large cup. Upon the delivery of the correct volume or the expiration of the preset beverage dispense time period, the microcontroller 51 changes the dispense state machine 75 from the "dispense over" state 137 to the "stop dispense" state 141. The dispense state machine 75 then relinquishes control of the microcontroller 51, and the supervisory control firmware calls the RS-232 interface state machine 76.

Upon the next calling of the dispense state machine 75, the microcontroller 51, in the "stop dispense" state 141, deactivates the activated valve of the dispensing valves 64. After the deactivation of the activated valve of the dispensing valves 64, the microcontroller 51 changes the dispense state machine 75 from the "stop dispense" state 141 to the "detect dispense" state 131. The dispense state machine 75 then relinquishes control of the microcontroller 51, and the supervisory control firmware calls the RS-232 interface state machine 76. With the next calling of the dispense state machine 75, the microcontroller 51 operates in the "detect dispense" state 131 as previously described.

When the beverage dispense request is for a beverage flavored syrup only, the microcontroller 51 returns to the "dispense delivery" state 134 upon the next calling of the dispense state machine 75. The microcontroller 51, in the "dispense delivery" state 134, activates an appropriate one of the dispensing valves 64, which dispenses the beverage flavored syrup only. After activating an appropriate one of the dispensing valves 64, the microcontroller 51 changes the dispense state machine 75 from the "dispense delivery" state 134 to the "dispense over" state 138. The dispense state machine 75 then relinquishes control of the microcontroller 51, and the supervisory control firmware calls the RS-232 interface state machine 76.

With the next calling of the dispense state machine 75, the microcontroller 51, in the "dispense over" state 138, determines when the activated valve of the dispensing valves 64 should be deactivated, thereby terminating the beverage dispense. As long as the microcontroller 51 determines the activated valve of the dispensing valves 64 does not require deactivation, it maintains the dispense state machine 75 in the "dispense over" state 138, whereupon the dispense state machine 75 immediately relinquishes control of the microcontroller 51 upon calling by the supervisory control firmware, which then calls the RS-232 interface state machine 76.

During manual control, once the microcontroller 51 determines the keypad state machine 71 has furnished a dispense off signal or signals associated with the activated valve of the dispensing valves 64, it changes the dispense state machine 75 from the "dispense over" state 138 to the "stop dispense" state 142. The dispense state machine 75 then relinquishes control of the microcontroller 51, and the supervisory control firmware calls the RS-232 interface state machine 76.

For a beverage flavored syrup only dispense into a medium cup, the microcontroller 51, under the direction of an appropriate preset beverage dispense command, activates the correct valve of the dispensing valves 64, which delivers beverage flavored syrup only in a volume or for a time period that fills the medium cup. Upon the delivery of the correct volume or the expiration of the preset beverage dispense time period, the microcontroller 51 changes the dispense state machine 75 from the "dispense over" state 138 to the "stop dispense" state 142. The dispense state machine 75 then relinquishes control of the microcontroller 51, and the supervisory control firmware calls the RS-232 interface state machine 76.

Upon the next calling of the dispense state machine 75, the microcontroller 51, in the "stop dispense" state 142, deactivates the activated valve of the dispensing valves 64. After the deactivation of the activated valve of the dispensing valves 64, the microcontroller 51 changes the dispense state machine 75 from the "stop dispense" state 142 to the "detect dispense" state 131. The dispense state machine 75 then relinquishes control of the microcontroller 51, and the supervisory control firmware calls the RS-232 interface state machine 76. With the next calling of the dispense state machine 75, the microcontroller 51 operates in the "detect dispense" state 131 as previously described.

When the beverage dispense request is for an additive flavoring only, the microcontroller 51 returns to the "dispense delivery" state 135 upon the next calling of the dispense state machine 75. The microcontroller 51, in the "dispense delivery" state 134, activates an appropriate one of the dispensing valves 64, which dispenses the additive flavoring only. After activating an appropriate one of the dispensing valves 64, the microcontroller 51 changes the dispense state machine 75 from the "dispense delivery" state 135 to the "dispense over" state 139. The dispense state machine 75 then relinquishes control of the microcontroller 51, and the supervisory control firmware calls the RS-232 interface state machine 76.

With the next calling of the dispense state machine 75, the microcontroller 51, in the "dispense over" state 139, determines when the activated valve of the dispensing valves 64 should be deactivated, thereby terminating the beverage dispense. As long as the microcontroller 51 determines the activated valve of the dispensing valves 64 does not require deactivation, it maintains the dispense state machine 75 in the "dispense over" state 139, whereupon the dispense state machine 75 immediately relinquishes control of the microcontroller 51 upon calling by the supervisory control firmware, which then calls the RS-232 interface state machine 76.

During manual control, once the microcontroller 51 determines the keypad state machine 71 has furnished a dispense off signal or signals associated with the activated valve of the dispensing valves 64, it changes the dispense state machine 75 from the "dispense over" state 139 to the "stop dispense" state 143. The dispense state machine 75 then relinquishes control of the microcontroller 51, and the supervisory control firmware calls the RS-232 interface state machine 76.

For an additive flavoring only dispense into a small cup, the microcontroller 51, under the direction of an appropriate preset beverage dispense command, activates the correct valve of the dispensing valves 64, which delivers an additive flavoring only in a volume or for a time period that fills the small cup. Upon the delivery of the correct volume or the expiration of the preset beverage dispense time period, the microcontroller 51 changes the dispense state machine 75 from the "dispense over" state 139 to the "stop dispense" state 143. The dispense state machine 75 then relinquishes control of the microcontroller 51, and the supervisory control firmware calls the RS-232 interface state machine 76.

Upon the next calling of the dispense state machine 75, the microcontroller 51, in the "stop dispense" state 143, deactivates the activated valve of the dispensing valves 64. After the deactivation of the activated valve of the dispensing valves 64, the microcontroller 51 changes the dispense state machine 75 from the "stop dispense" state 143 to the "detect dispense" state 131. The dispense state machine 75 then relinquishes control of the microcontroller 51, and the supervisory control firmware calls the RS-232 interface state machine 76. With the next calling of the dispense state machine 75, the microcontroller 51 operates in the "detect dispense" state 131 as previously described.

Figure 13:
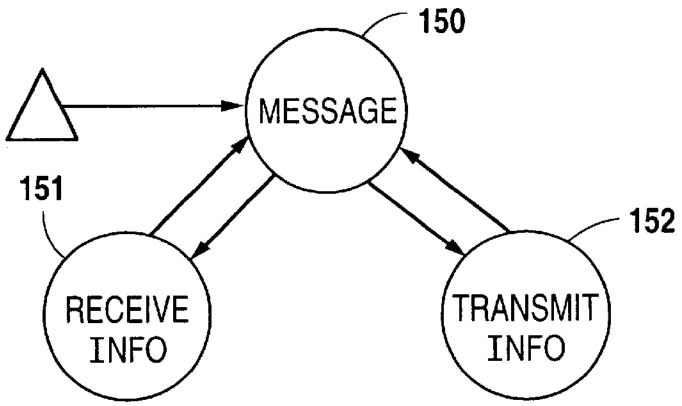
FIG. 13 is a flow chart illustrating an RS-232 interface state machine of FIG. 5.

As illustrated in FIG. 13, the supervisory control loop calls the RS-232 interface state machine 76, which assumes control of the microcontroller 51, once the dispense state machine 75 relinquishes control of the microcontroller 51. The RS-232 interface state machine 76 begins in a "message" state 150 where the microcontroller 51 determines, utilizing the RS-232 interface 59, whether an external device, such as a dispenser service tool, a personal computer, a laptop computer, and the like, contains external communication information requiring transmission to the electronic control system 50. The microcontroller 51, in the "message state 150, further determines whether the electronic control system 50 contains beverage dispenser information requiring transmission to an external device. As long as an external device does not contain external communication information requiring transmission or the electronic control system 50 does not contain beverage dispenser information requiring transmission, the RS-232 interface state machine 76 immediately relinquishes control of the microcontroller 51 upon calling by the supervisory control firmware, which then calls the device interface state machine 77.

When the microcontroller 51 determines an external device contains external communication information requiring transmission to the electronic control system 50, it changes the RS-232 interface state machine 76 from the "message" state 150 to the "receive" state 151. The RS-232 interface state machine 76 then relinquishes control of the microcontroller 51, and the supervisory control firmware calls the device interface state machine 77.

Upon the next calling of the RS-232 interface state machine 76, the microcontroller 51, in the "receive" state 151, inputs the external communication information via the RS-232 interface and then performs any necessary processing in accordance with the instructions contained in the external communication information. External communication information received from an external device includes, but is not limited to, ratio control parameters, beverage dispenser control information utilized in the process of testing and diagnosing faults in the beverage dispenser, and firmware for modifying or replacing the existing supervisory control firmware, dispenser tasks firmware, or low-level driver's firmware. The microcontroller 51 then changes the RS-232 interface state machine 76 from the "receive" state 151 to the "message" state 150, whereupon the RS-232 interface state machine 76 relinquishes control of the microcontroller 51, and the supervisory control firmware calls the device interface state machine 77. With the next calling of the RS-232 interface state machine 76, the microcontroller 51 operates in the "message" state 150 as previously described.

When the microcontroller 51 determines the electronic control system 50 contains beverage dispenser information requiring transmission to an external device, it changes the RS-232 interface state machine 76 from the "message" state 150 to the "transmit" state 152. The RS-232 interface state machine 76 then relinquishes control of the microcontroller 51, and the supervisory control firmware calls the device interface state machine 77.

Upon the next calling of the RS-232 interface state machine 76, the microcontroller 51, in the "transmit" state 151, outputs the beverage dispenser information to the external device via the RS-232 interface. Beverage dispenser information includes, but is not limited to, time and date stamped sales, diagnostic, and service information. The microcontroller 51 then changes the RS-232 interface state machine 76 from the "transmit" state 152 to the "message" state 150, whereupon the RS-232 interface state machine 76 relinquishes control of the microcontroller 51, and the supervisory control firmware calls the device interface state machine 77. With the next calling of the RS-232 interface state machine 76, the microcontroller 51 operates in the "message" state 150 as previously described.

Figure 14:
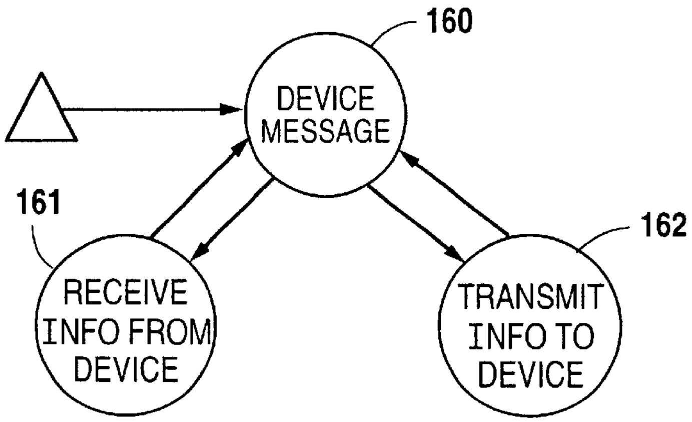
FIG. 14 is a flow chart illustrating a device interface state machine of FIG. 5.

As illustrated in FIG. 14, the device interface state machine 77 includes firmware that permits the electronic control system 50, through the microcontroller 51, to control devices, such as coin acceptors, coin and bill changers, bill validators, credit card validators, network connections, and the like. The device interface state machine 77 begins in a "device message" state 160 where the microcontroller 51 determines, utilizing the device interface 60, whether the electronic control system 50 has received a communication from a device. The microcontroller 51, in the "device message" state 160, further determines whether the electronic control system 50 contains information that requires transmission to a device. As long as the electronic control system 50 has not received a communication from a device or does not contain information that requires transmission, the device interface state machine 77 immediately relinquishes control of the microcontroller 51 upon calling by the supervisory control firmware, which then calls the modem interface state machine 78.

When the microcontroller 51 determines the electronic control system 50 has received a communication from a device, it changes the device interface state machine 77 from the "device message" state 160 to the "receive" state 161. The device interface state machine 77 then relinquishes control of the microcontroller 51, and the supervisory control firmware calls the modem interface state machine 78.

Upon the next calling of the device interface state machine 77, the microcontroller 51, in the "receive" state 161, inputs the device communication via the device interface 60 and then performs any necessary processing in accordance with the information contained therein. Illustratively, if the device is a coin and bill changer, the microcontroller 51 inputs the information, which would be the denomination of the coin or the bill. After inputting the information, the microcontroller 51 determines the correct change for return by the coin and bill changer. The microcontroller 51 then changes device interface state machine 77 from the "receive" state 161 to the "device message" state 160, whereupon the device interface state machine 77 relinquishes control of the microcontroller 51, and the supervisory control firmware calls the modem interface state machine 78. With the next calling of the device interface state machine 77, the microcontroller 51 operates in the "device message" state 160 as previously described.

When the microcontroller 51 determines the electronic control system 50 contains information that requires transmission to a device, it changes the device interface state machine 77 from the "device message" state 160 to the "transmit" state 162. The device interface state machine 77 then relinquishes control of the microcontroller 51, and the supervisory control firmware calls the modem interface state machine 78.

Upon the next calling of the device interface state machine 77, the microcontroller 51, in the "receive" state 161, outputs the information to the device via the device interface 60. Illustratively, if the microcontroller 51 contains correct change information, it transmits, via the device interface 60, a control signal that directs the coin and bill changer to discharge the correct change. The microcontroller 51 then changes device interface state machine 77 from the "transmit" state 162 to the "device message" state 160, whereupon the device interface state machine 77 relinquishes control of the microcontroller 51, and the supervisory control firmware calls the modem interface state machine 78. With the next calling of the device interface state machine 77, the microcontroller 51 operates in the "device message" state 160 as previously described.

Figure 15:
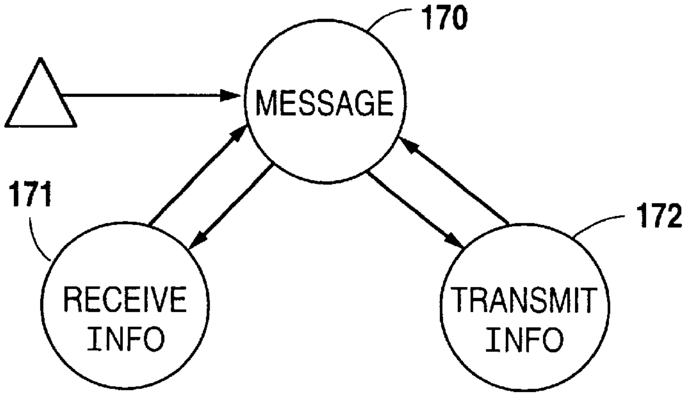
FIG. 15 is a flow chart illustrating a modem interface state machine of FIG. 5.

As illustrated in FIG. 15, the supervisory control loop calls the modem interface state machine 78, which assumes control of the microcontroller 51, once the device interface state machine 77 relinquishes control of the microcontroller 51. The modem interface state machine 78 begins in a "message" state 170 where the microcontroller 51 determines, utilizing the modem 61, whether the electronic control system 50 has received external communication information from a remotely located external device, such as a dispenser service tool, a personal computer, a laptop computer, and the like, utilizing existing phone lines, cellular systems, or satellite based communication systems. The microcontroller 51, in the "message" state 170, further determines whether the electronic control system 50 contains beverage dispenser information requiring transmission to a remotely located external device. As long as the electronic control system 50 has not received external communication information from a remotely located external device or does not contain beverage dispenser information requiring transmission, the modem interface state machine 78 immediately relinquishes control of the microcontroller 51 upon calling by the supervisory control firmware, which then calls the dispenser data collection state machine 79.

When the microcontroller 51 determines the electronic control system 50 has received external communication information from a remotely located external device, it changes the modem interface state machine 78 from the "message" state 170 to the "receive" state 171. The modem interface state machine 78 then relinquishes control of the microcontroller 51, and the supervisory control firmware calls the dispenser data collection state machine 79.

Upon the next calling of the modem interface state machine 78, the microcontroller 51, in the "receive" state 171, inputs the external communication information via the modem interface and then performs any necessary processing in accordance with the instructions contained in the external communication information. External communication information received from a remotely located external device includes, but is not limited to, ratio control parameters, beverage dispenser control information utilized in the process of testing and diagnosing faults in the beverage dispenser, and firmware for modifying or replacing the existing supervisory control firmware, dispenser tasks firmware, or low-level driver's firmware. The microcontroller 51 then changes the modem interface state machine 78 from the "receive" state 171 to the "message" state 170, whereupon the modem interface state machine 78 relinquishes control of the microcontroller 51, and the supervisory control firmware calls the dispenser data collection state machine 79. With the next calling of the modem interface state machine 78, the microcontroller 51 operates in the "message" state 170 as previously described.

When the microcontroller 51 determines the electronic control system 50 contains beverage dispenser information requiring transmission to a remotely located external device, it changes the modem interface state machine 78 from the "message" state 170 to the "transmit" state 172. The modem interface state machine 78 then relinquishes control of the microcontroller 51, and the supervisory control firmware calls the dispenser data collection state machine 79.

Upon the next calling of the modem interface state machine 78, the microcontroller 51, in the "transmit" state 171, outputs the beverage dispenser information to the external device via the modem 61 utilizing existing phone lines, cellular systems, or satellite based communication systems. Beverage dispenser information includes, but is not limited to, time and date stamped sales, diagnostic, and service information. The microcontroller 51 then changes the modem interface state machine 78 from the "transmit" state 172 to the "message" state 170, whereupon the modem interface state machine 78 relinquishes control of the microcontroller 51, and the supervisory control firmware calls the dispenser data collection state machine 79. With the next calling of the modem interface state machine 78, the microcontroller 51 operates in the "message" state 170 as previously described.

Figure 16:
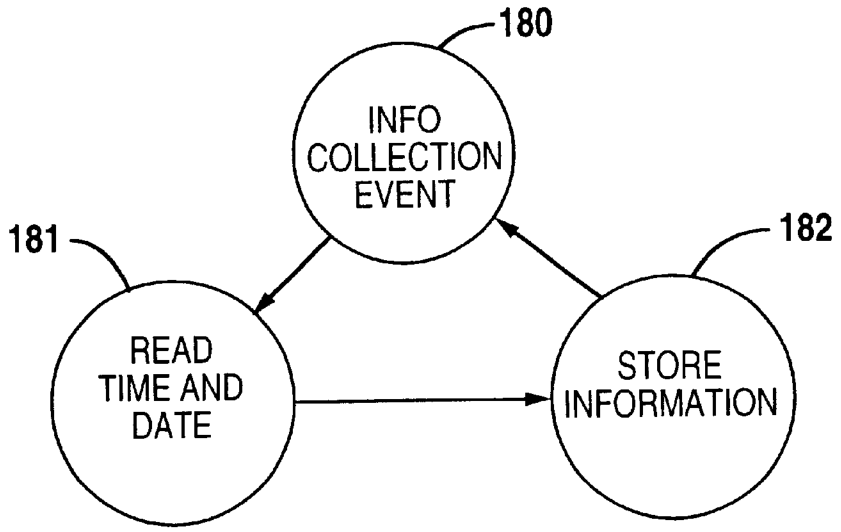
FIG. 16 is a flow chart illustrating a dispenser data collection state machine of FIG. 5.

As illustrated in FIG. 16, the supervisory control loop calls the dispenser data collection state machine 79, which assumes control of the microcontroller 51, once the modem interface state machine 78 relinquishes control of the microcontroller 51. The dispenser data collection state machine 79 begins in an "event" state 180 where the microcontroller 51 determines if a beverage dispenser information collection event has occurred. As long as a beverage dispenser information collection event has not occurred, the dispenser data collection state machine 79 immediately relinquishes control of the microcontroller 51 upon calling by the supervisory control firmware, which then calls the service monitor state machine 80.

A beverage dispenser information collection event occurs when the microcontroller 51, under the direction of the supervisory control firmware, collects beverage dispenser information during the execution of the dispenser tasks firmware. Illustratively, during a beverage dispense as effected by the dispense state machine 75, the microcontroller 51 tracks each beverage dispense to ascertain such beverage dispenser information as the frequency a beverage flavor is selected, the volume of each particular beverage flavored syrup dispensed, the volume of each particular additive flavoring dispensed, the volume of diluent dispensed, the number of cups dispensed, and the size of each dispensed cup. In a further illustration, the microcontroller 51 tracks the flow of beverage flavored syrup and additive flavoring to determine when a beverage flavored syrup source or an additive flavoring source requires replacement. Beverage dispenser information, in this embodiment, includes, but is not limited to, time and date stamped sales, diagnostic, and service information, such as the frequency a beverage flavor is selected, the volume of each particular beverage flavored syrup dispensed, the volume of each particular additive flavoring dispensed, the volume of diluent dispensed, the number of cups dispensed, the size of each dispensed cup, whether the ratio between beverage flavored syrup and diluent has changed, whether beverage flavored syrup or additive flavoring sources are empty, whether beverage dispenser errors have occurred, and when a dispenser service tool was last connected or disconnected.

When the microcontroller 51 detects a beverage dispenser information collection event, it changes the dispenser data collection state machine 79 from the "event" state 180 to a "read" state 181. The dispenser data collection state machine 79 then relinquishes control of the microcontroller 51, and the supervisory control firmware calls the service monitor state machine 80.

Upon the next calling of the dispenser data collection state machine 79, the microcontroller 51, in the "read" state 171, reads the time and date from the real time clock 56. Once the microcontroller 51 reads the time and date, it changes the dispenser data collection state machine 79 from the "read" state 181 to a "store" state 182, whereupon the dispenser data collection state machine 79 relinquishes control of the microcontroller 51, and the supervisory control firmware calls the service monitor state machine 80.

After the next calling of the dispenser data collection state machine 79, the microcontroller 51, in the "store" state 171, stores the collected beverage dispenser information in the memory 55, including the time and date, using an address developed by the supervisory control firmware. Once the microcontroller 51 stores the collected beverage dispenser information, it changes the dispenser data collection state machine 79 from the "store" state 182 to the "event" state 180, whereupon the dispenser data collection state machine 79 relinquishes control of the microcontroller 51, and the supervisory control firmware calls the service monitor state machine 80. With the next calling of the dispenser data collection state machine 79, the microcontroller 51 operates in the "event" state 180 as previously described.

Figure 17:
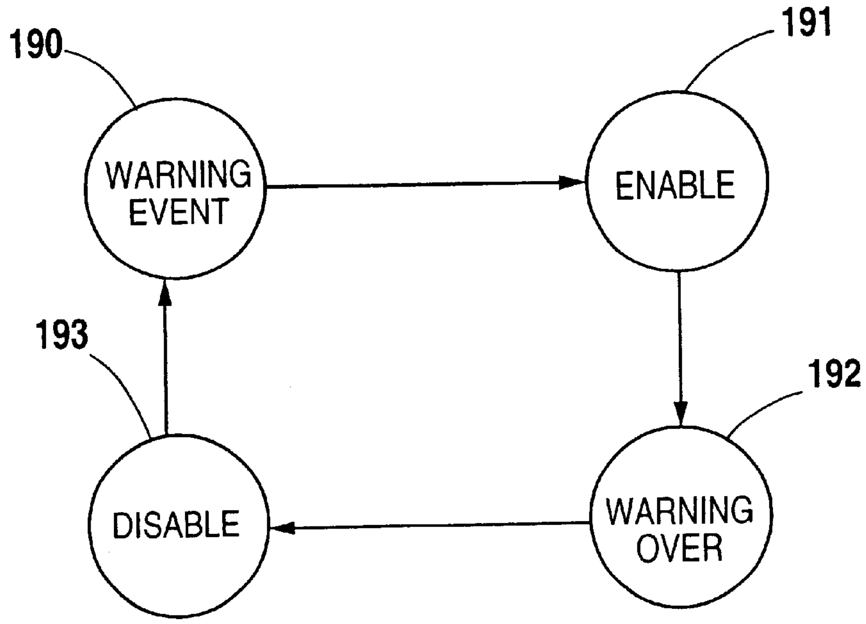
FIG. 17 is a flow chart illustrating a service monitor state machine of FIG. 5.

As illustrated in FIG. 17, the supervisory control loop calls the service monitor state machine 80, which assumes control of the microcontroller 51, once the dispenser data collection state machine 79 relinquishes control of the microcontroller 51. The service monitor state machine 80 begins in an "event" state 190 where the microcontroller 51 determines whether a warning must be issued, which is accomplished through either the activation of a suitable warning device, such as an audible or visual alarm or, alternatively, through the transmission of an error signal utilizing the RS-232 interface 59 or the modem 61 as previously described. As long as no warning must be issued, the service monitor state machine 80 immediately relinquishes control of the microcontroller 51 upon calling by the supervisory control firmware, which then calls the keypad state machine 71.

In this embodiment, the microcontroller 51 determines whether a warning must be issued by reading from the memory 55, using the address supplied by the supervisory control firmware, malfunction signals, such as the compressor malfunction signal, the carbonation malfunction signal, a masked push-button switch signal, a no water flow signal, and the like. Similarly, the microcontroller 51 reads from the memory 55, using the address supplied by the supervisory control firmware, whether a beverage flavored syrup source or an additive flavoring source requires replacement. When the information read by the microcontroller 51 indicates an error condition, it changes the service monitor state machine 80 from the "event" state 190 to an "enable" state 191. The service monitor state machine 80 then relinquishes control of the microcontroller 51, and the supervisory control firmware calls the keypad state machine 71.

After the next calling of the service monitor state machine 80, the microcontroller 51, in the "enable" state 191, activates the warning device. Furthermore, the microcontroller 51 could generate an error signal, which it stores in the memory 55 using an address supplied by the supervisory control firmware. The microcontroller 51 later transmits that error signal to an external device under the direction of either the RS-232 interface state machine 76 or the modem interface state machine 78 as previously described. Once the warning device is activated, the microcontroller 51 changes the service monitor state machine 80 from the "enable" state 191 to an "over" state 192, whereupon the service monitor state machine 80 relinquishes control of the microcontroller 51, and the supervisory control firmware calls the keypad state machine 71.

Upon the next calling of the service monitor state machine 80, the microcontroller 51, in the "over" state 192, determines whether the warning device requires deactivation and/or the generated error signal should be deleted. As long as the warning device does not need deactivation and/or the generated error signal does not require deletion, the service monitor state machine 80 immediately relinquishes control of the microcontroller 51 upon calling by the supervisory control firmware, which then calls the keypad state machine 71.

In this embodiment, the microcontroller 51 determines whether the warning device requires deactivation and/or the generated error signal should be deleted by reading from the memory 55 the malfunction signals and whether a beverage flavored syrup source or an additive flavoring source requires replacement. When that information indicates the absence of an error condition, the microcontroller 51 changes the service monitor state machine 80 from the "over" state 192 to an "disable" state 193. The service monitor state machine 80 then relinquishes control of the microcontroller 51, and the supervisory control firmware calls the keypad state machine 71.

After the next calling of the service monitor state machine 80, the microcontroller 51, in the "disable" state 193, deactivates the warning device. Furthermore, the microcontroller 51 deletes the error signal, which it previously had stored in the memory 55. Once the warning device is deactivated, the microcontroller 51 changes the service monitor state machine 80 from the "disable" state 193 to an "event" state 190, whereupon the service monitor state machine 80 relinquishes control of the microcontroller 51, and the supervisory control firmware calls the keypad state machine 71. With the next calling of the service monitor state machine 80, the microcontroller 51 operates in the "event" state 190 as previously described.

As explained in the foregoing embodiments, an electronic control system for a beverage dispenser configured according to a state machine system architecture that supports either a non-preemptive or a preemptive multitasking real time operating system provides extreme flexibility, modularity, and design portability. Thus, although the electronic control system for a beverage dispenser has been described in terms of the foregoing embodiments, such description has been for exemplary purposes only and, as will be apparent to those of ordinary skill in the art, many alternatives, equivalents, and variations of varying degrees will fall within the scope of the electronic control system for a beverage dispenser. That scope, accordingly, is not to be limited in any respect by the foregoing embodiments, rather, it is defined only by the claims that follow.

We claim:

1. A method of controlling a carbonation system of a beverage dispenser, comprising the steps of:

providing a beverage dispenser, comprising:
- a carbonation system including a liquid level monitoring system, and
- an electronic control system, comprising:
  - a carbonation control to permit interfacing with the carbonation system,
  - a microcontroller for controlling the carbonation control, and
  - a program memory including a carbonation state machine for controlling the microcontroller, wherein the carbonation state machine includes an off state, a probes exposed state, an on state, and a probes unexposed state;

calling the carbonation state machine to assume control of the microcontroller;

deactivating in the off state a pump of the carbonation system via the carbonation control;

changing the carbonation state machine from the off state to the probes exposed state;

relinquishing control of the microcontroller upon the changing of the carbonation state machine from the off state to the probes exposed state;

determining in the probes exposed state via the liquid level monitoring system when there is insufficient liquid in the carbonation system;

relinquishing control of the microcontroller as long as the carbonation state machine remains in the probes exposed state;

changing the carbonation state machine from the probes exposed state to the on state when the liquid level monitoring system registers that there is insufficient liquid in the carbonation system;

relinquishing control of the microcontroller upon the changing of the carbonation state machine from the probes exposed state to the on state;

activating in the on state the pump of the carbonation system via the carbonation control;

changing the carbonation state machine from the on state to the probes unexposed state;

relinquishing control of the microcontroller upon the changing of the carbonation state machine from the on state to the probes unexposed state;

determining in the probes unexposed state via the liquid level monitoring system when there is sufficient liquid in the carbonation system;

relinquishing control of the microcontroller as long as the carbonation state machine remains in the probes unexposed state;

changing from the probes unexposed state to the off state when the liquid level monitoring system registers that there is sufficient liquid in the carbonation system or upon the expiration of a preset time period; and relinquishing control of the microcontroller upon the changing of the carbonation state machine from the probes unexposed state to the off state.

2. The method of controlling a carbonation system of a beverage dispenser according to claim 1, further comprising the steps of:

activating in the on state an on timer;

determining in the probes unexposed state if the on timer has expired; and changing from the probes unexposed state to the off state upon the expiration of the on timer.

3. A method of controlling a carbonation system of a beverage dispenser, comprising the steps of:

providing a beverage dispenser, comprising:
- a carbonation system including a liquid level monitoring system, and
- an electronic control system, comprising:
  - a carbonation control to permit interfacing with the carbonation system,
  - a microcontroller for controlling the carbonation control, and
  - a program memory including a carbonation state machine for controlling the microcontroller, wherein the carbonation state machine includes an off state, a probes exposed state, an on state, and a probes unexposed state;

sequentially calling the carbonation state machine to assume control of the microcontroller;

deactivating in the off state a pump of the carbonation system via the carbonation control;

changing the carbonation state machine from the off state to the probes exposed state;

relinquishing control of the microcontroller upon the changing of the carbonation state machine from the off state to the probes exposed state;

determining in the probes exposed state via the liquid level monitoring system when there is insufficient liquid in the carbonation system;

relinquishing control of the microcontroller as long as the carbonation state machine remains in the probes exposed state;

changing the carbonation state machine from the probes exposed state to the on state when the liquid level monitoring system registers that there is insufficient liquid in the carbonation system;

relinquishing control of the microcontroller upon the changing of the carbonation state machine from the probes exposed state to the on state;

activating in the on state the pump of the carbonation system via the carbonation control;

changing the carbonation state machine from the on state to the probes unexposed state;

relinquishing control of the microcontroller upon the changing of the carbonation state machine from the on state to the probes unexposed state;

determining in the probes unexposed state via the liquid level monitoring system when there is sufficient liquid in the carbonation system;

relinquishing control of the microcontroller as long as the carbonation state machine remains in the probes unexposed state;

changing from the probes unexposed state to the off state when the liquid level monitoring system registers that there is sufficient liquid in the carbonation system or upon the expiration of a preset time period; and relinquishing control of the microcontroller upon the changing of the carbonation state machine from the probes unexposed state to the off state.

4. The method of controlling a carbonation system of a beverage dispenser according to claim 3, further comprising the steps of:

activating in the on state an on timer;

determining in the probes unexposed state if the on timer has expired; and changing from probes unexposed state to the off state upon the expiration of the on timer.

* * * * *